United States Patent
Zhou et al.

(10) Patent No.: US 11,563,531 B2
(45) Date of Patent: Jan. 24, 2023

(54) COMMUNICATION CONFIGURATION FOR MULTIPLE COMPONENT CARRIERS

(71) Applicant: QUALCOMM incorporated, San Diego, CA (US)

(72) Inventors: Yan Zhou, San Diego, CA (US); Tao Luo, San Diego, CA (US); Ruhua He, San Diego, CA (US); Stefan Brueck, Neunkirchen am Brand (DE)

(73) Assignee: QUALCOMM Incorporated, San Diego, CA (US)

( * ) Notice: Subject to any disclaimer, the term of this patent is extended or adjusted under 35 U.S.C. 154(b) by 106 days.

(21) Appl. No.: 16/861,404

(22) Filed: Apr. 29, 2020

(65) Prior Publication Data
US 2020/0351039 A1    Nov. 5, 2020

Related U.S. Application Data

(60) Provisional application No. 62/843,216, filed on May 3, 2019.

(51) Int. Cl.
*H04L 5/00* (2006.01)
*H04W 72/04* (2009.01)

(52) U.S. Cl.
CPC .......... *H04L 5/001* (2013.01); *H04L 5/0023* (2013.01); *H04L 5/0094* (2013.01); *H04W 72/042* (2013.01); *H04W 72/044* (2013.01)

(58) Field of Classification Search
CPC ..... H04L 5/0025; H04L 5/0094; H04L 5/001; H04L 5/0098; H04L 5/0023;
(Continued)

(56) References Cited

U.S. PATENT DOCUMENTS

2019/0239245 A1*  8/2019  Davydov ............... H04W 16/28
2020/0287610 A1*  9/2020  Zhou .................... H04L 5/001
(Continued)

OTHER PUBLICATIONS

ERICSSON: "Remaining Issues on Beam Measurement and Reporting", 3GPP TSG-RAN WG1 Meeting #93, 3GPP Draft; R1-1806217 Remaining Issues for Beam Measurement and Reporting, 3rd Generation Partnership Project (3GPP), Mobile Competence Centre; 650, Route Des Lucioles; F-06921 Sophia-Antipolis Cedex, vol. RAN WG1, No. Busan, Korea; May 21, 2018-May 25, 2018, May 20, 2018 (May 20, 2018), pp. 1-13, XP051441426, Retrieved from the Internet: URL: http://www.3gpp.org/ftp/Meetings%5F3GPP%5FSYNC/RAN1/Docs/ [retrieved on May 20, 2018] paragraph [2.2.1].section 2.

(Continued)

*Primary Examiner* — Maharishi V Khirodhar
*Assistant Examiner* — Kenneth P Hunt
(74) *Attorney, Agent, or Firm* — Holland & Hart LLP

(57) ABSTRACT

Methods, systems, and devices for wireless communications are described. A base station may identify an active transmission configuration indicator (TCI) state, a set of active TCI states, and/or a spatial relation reference signal identifier to be used for one or more component carriers (CCs) of a UE. The base station may then transmit a control message to the UE that may indicate the identified active TCI state, set of active TCI states, and/or spatial relation reference signal identifier to be used for one or more CCs and/or bandwidth parts of the UE. The UE may determine a communication configuration for a CC of the plurality of CC based on the control message and an optional shared command indication. The UE may the apply the TCI state or set of active TCI states to a subset of CCs, or UE may configure sounding reference signals for a subset of CCs.

43 Claims, 20 Drawing Sheets

(58) Field of Classification Search
CPC ............ H04L 5/0053; H04W 72/042; H04W 72/044; H04W 72/0453
See application file for complete search history.

(56) References Cited

U.S. PATENT DOCUMENTS

| | | | |
|---|---|---|---|
| 2020/0313729 A1* | 10/2020 | Zhou ..................... | H04L 5/0048 |
| 2020/0314829 A1* | 10/2020 | Venugopal ............ | H04W 76/11 |
| 2020/0351069 A1* | 11/2020 | Grant .................... | H04L 5/0098 |
| 2021/0212101 A1* | 7/2021 | Jiang ..................... | H04L 5/001 |

OTHER PUBLICATIONS

International Search Report and Written Opinion—PCT/US2020/030726—ISA/EPO—dated Aug. 7, 2020.
Qualcomm Incorporated: "Beam Management for NR", 3GPP Draft, 3GPP TSG-RAN WG1 Meeting 93, R1-1807341 Beam Management for NR, 3RD Generation Partnership Project (3GPP),Mobile Competence Centre, 650, Route Des Lucioles, F-06921 Sophia-Antipolis Cedex, France, vol. RAN WG1, No. Busan, Korea, May 21, 2018-May 25, 2018, May 20, 2018 (May 20, 2018), XP051442533, 11 Pages, Retrieved from the Internet:URL:http://www.3gpp.org/ftp/Meetings_3GPP_SYNC/RAN1/Docs/ [retrieved on May 20, 2018], Sections 1-4, 7, 9-17.

* cited by examiner

COMMUNICATION CONFIGURATION FOR MULTIPLE COMPONENT CARRIERS

CROSS REFERENCE

The present application for patent claims the benefit of U.S. Provisional Patent Application No. 62/843,216 by ZHOU et al., entitled "COMMUNICATION CONFIGURATION FOR MULTIPLE COMPONENT CARRIERS," filed May 3, 2019, assigned to the assignee hereof, and expressly incorporated by reference herein.

TECHNICAL FIELD

The following relates to wireless communications, and specifically to communication configurations for multiple component carriers in a wireless communications system.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, a wireless communications system may use carrier aggregation, which may allow the use of multiple component carriers (CCs) for communications. Some CCs may be divided into bandwidth parts (BWPs). A UE may support up to 16 CCs for downlink and up to 16 CCs for uplink. Each CC may be uniquely identified and configured for physical channel and reference signal transmissions. For example, a beam selection may be indicated to a UE via a medium access control-control element (MAC-CE) for each downlink and uplink CC. The configuration of each CC may lead to increased signaling overhead in the wireless system.

SUMMARY

The described techniques relate to improved methods, systems, devices, and apparatuses that support communication configuration for multiple component carriers (CCs). Generally, the described techniques provide for efficient medium access control-control element (MAC-CE) signaling for selection of a transmission configuration indicator (TCI) state identifier (ID), a set of active TCI states, or spatial relation for sound reference signals for multiple bandwidth parts (BWPs) and/or CCs. A base station may identify an active TCI state, a set of active TCI states, and/or a spatial relation reference signal identifier to be used for one or more CCs of user equipment (UE). The base station may transmit a control message (e.g., MAC-CE) to UE that indicates the identified active TCI state, set of active TCI states, and/or spatial relation reference signal identifier to be used for one or more CCs of UE. Additionally or alternatively, base station may optionally transmit a shared command indication (e.g., via MAC-CE or radio resource control (RRC)) to UE that indicates which CCs (and/or BWPs) may also follow the indication transmitted in the control message.

The UE may determine a communication configuration for a CC of the plurality of CC based on the control message and optional shared command indication. Based on the determination, the UE may optionally apply a TCI state to subset of CCs, apply a set of active TCI states to a set of BWP CCs pairs, or configure sounding reference signal (SRS) for each BWP CC pair. UE may transmit or receive communication to or from the base station based on the applied configuration.

A method of wireless communications at a UE is described. The method may include receiving a control message from a base station that indicates, for a plurality of CCs configured for the UE, one or more of: an active TCI state, a set of active TCI states, or a spatial relation reference signal identifier, determining a communication configuration for the plurality of CCs based on the control message, and performing or receiving a transmission using the plurality of CCs based on the communication configuration.

An apparatus for wireless communications at a UE is described. The apparatus may include a processor, memory in electronic communication with the processor, and instructions stored in the memory. The instructions may be executable by the processor to cause the apparatus to receive a control message from a base station that indicates, for a plurality of CCs configured for the UE, one or more of: an active TCI state, a set of active TCI states, or a spatial relation reference signal (RS) identifier, determine a communication configuration for the plurality of CCs based on the control message, and perform or receiving a transmission using the plurality of CCs based on the communication configuration.

Another apparatus for wireless communications at a UE is described. The apparatus may include means for receiving a control message from a base station that indicates, for a plurality of CCs configured for the UE, one or more of: an active TCI state, a set of active TCI states, or a spatial relation RS identifier, determining a communication configuration for the plurality of CCs based on the control message, and performing or receiving a transmission using the plurality of CCs based on the communication configuration.

A non-transitory computer-readable medium storing code for wireless communications at a UE is described. The code may include instructions executable by a processor to receive a control message from a base station that indicates, for a plurality of CCs configured for the UE, one or more of: an active TCI state, a set of active TCI states, or a spatial relation RS identifier, determine a communication configuration for the plurality of CCs based on the control message, and perform or receiving a transmission using the plurality of CCs based on the communication configuration.

Some examples of the method, apparatuses, and non-transitory computer-readable medium described herein may further include operations, features, means, or instructions for identifying a control resource set identifier that may be common to a subset of CCs of the set of CCs based on the control message, and applying the active TCI state to each CC of the subset of CCs associated with the control resource set identifier.

Some examples of the method, apparatuses, and non-transitory computer-readable medium described herein may further include operations, features, means, or instructions for identifying a second subset of CCs of the set of CCs, where each CC of the second subset of CCs may be associated with a same set of configured candidate TCI states as each CC of the subset of CCs indicated in the control message, and applying the active TCI state to each CC of the second subset of CCs.

Some examples of the method, apparatuses, and non-transitory computer-readable medium described herein may further include operations, features, means, or instructions for identifying a second subset of CCs of the set of CCs, where each CC of the second subset of CCs may be associated with a same set of configured candidate TCI states, and applying the active TCI state to each CC of the second subset of CCs.

Some examples of the method, apparatuses, and non-transitory computer-readable medium described herein may further include operations, features, means, or instructions for identifying a second subset of CCs of the set of CCs, where each CC of the second subset of CCs may be associated with a same frequency band, and applying the active TCI state to each CC of the second subset of CCs.

Some examples of the method, apparatuses, and non-transitory computer-readable medium described herein may further include operations, features, means, or instructions for identifying a first set of BWP CC pairs based on the control message, where each of the first set of BWP CC pairs includes a CC of the set of CCs, and applying the set of active TCI states for the shared channel across each of the first set of BWP CC pairs.

Some examples of the method, apparatuses, and non-transitory computer-readable medium described herein may further include operations, features, means, or instructions for identifying a second set of BWP CC pairs, where each of the second set of BWP CC pairs may be associated with a same set of configured candidate TCI states as each of the first set of BWP CC pairs indicated in the control message, and applying the set of active TCI states for the shared channel across each of the second set of BWP CC pairs.

Some examples of the method, apparatuses, and non-transitory computer-readable medium described herein may further include operations, features, means, or instructions for identifying a second set of BWP CC pairs, where each of the second set of BWP CC pairs may be associated with a same set of configured candidate TCI states, and applying the set of active TCI states for the shared channel across each of the second set of BWP CC pairs.

Some examples of the method, apparatuses, and non-transitory computer-readable medium described herein may further include operations, features, means, or instructions for identifying a second set of BWP CC pairs, where each BWP CC pair of the second set of BWP CC pairs may be associated with a same frequency band, and applying the active TCI state to each BWP CC pair of the second set of BWP CC pairs.

In some examples of the method, apparatuses, and non-transitory computer-readable medium described herein, the shared channel includes a PDSCH.

Some examples of the method, apparatuses, and non-transitory computer-readable medium described herein may further include operations, features, means, or instructions for identifying a first set of BWP CC pairs based on the control message, where each of the first set of BWP CC pairs includes a CC of the set of CCs, and configuring resources for the SRS for each of the first set of BWP CC pairs according to the spatial relation RS identifier.

Some examples of the method, apparatuses, and non-transitory computer-readable medium described herein may further include operations, features, means, or instructions for identifying a second set of BWP CC pairs, where each of the second set of BWP CC pairs may be associated with a same set of configured candidate TCI states as each of the first set of BWP CC pair indicated in the control message, and configuring resources for the SRS for each of the second set of BWP CC pairs.

Some examples of the method, apparatuses, and non-transitory computer-readable medium described herein may further include operations, features, means, or instructions for identifying a second set of BWP CC pairs, where each of the second set of BWP CC pairs may be associated with a same set of configured candidate TCI states, and configuring resources for the SRS for each of the second set of BWP CC pairs.

Some examples of the method, apparatuses, and non-transitory computer-readable medium described herein may further include operations, features, means, or instructions for identifying a second set of BWP CC pairs, where each BWP CC pair of the second set of BWP CC pairs may be associated with a same frequency band, and configuring resources for the SRS for each of the second set of BWP CC pairs.

In some examples of the method, apparatuses, and non-transitory computer-readable medium described herein, the SRS includes a periodic SRS, a semi-persistent SRS, or an aperiodic SRS.

Some examples of the method, apparatuses, and non-transitory computer-readable medium described herein may further include operations, features, means, or instructions for identifying the set of CCs or a set of BWP CC pairs for configuration according to the active TCI state, the set of active TCI states, or the spatial relation RS identifier based on a format of the control message, where the format corresponds to a TCI selection format.

Some examples of the method, apparatuses, and non-transitory computer-readable medium described herein may further include operations, features, means, or instructions for receiving an indication of the set of CCs or a set of BWP CC pairs for configuration according to the active TCI state, the set of active TCI states, or the spatial relation RS identifier, where the indication may be separate from the control message.

Some examples of the method, apparatuses, and non-transitory computer-readable medium described herein may further include operations, features, means, or instructions for reporting, to the base station, a group of CCs or a set of BWP CC pairs configured for the UE that may be spatially quasi-located, where the group of CCs or the set of BWP CC pairs includes the set of CCs.

In some examples of the method, apparatuses, and non-transitory computer-readable medium described herein, the control message includes a MAC-CE.

A method of wireless communications at a base station is described. The method may include identifying, for a plurality of CCs configured for a UE, one or more of: an active TCI state, a set of active TCI states, or a spatial relation RS identifier, transmitting a control message to the UE that indicates the active TCI state, the set of active TCI states, the spatial relation RS identifier, or any combination thereof for the set of CCs, and performing or receiving a transmission using the plurality of CCs configured based on the control message.

An apparatus for wireless communications at a base station is described. The apparatus may include a processor, memory in electronic communication with the processor, and instructions stored in the memory. The instructions may be executable by the processor to cause the apparatus to identify, for a set of CCs configured for a UE, one or more of: an active TCI state, a set of active TCI states, or a spatial relation RS identifier, transmit a control message to the UE that indicates the active TCI state, the set of active TCI states, the spatial relation RS identifier, or any combination thereof for the set of CCs, and perform or receiving a transmission using the plurality of CCs configured based on the control message.

Another apparatus for wireless communications at a base station is described. The apparatus may include means for identifying, for a set of CCs configured for a UE, one or more of: an active TCI state, a set of active TCI states, or a spatial relation RS identifier, transmitting a control message to the UE that indicates the active TCI state, the set of active TCI states, the spatial relation RS identifier, or any combination thereof for the set of CCs, and performing or receiving a transmission using the plurality of CCs configured based on the control message.

A non-transitory computer-readable medium storing code for wireless communications at a base station is described. The code may include instructions executable by a processor to identify, for a set of CCs configured for a UE, one or more of: an active TCI state, a set of active TCI states, or a spatial relation RS identifier, transmit a control message to the UE that indicates the active TCI state, the set of active TCI states, the spatial relation RS identifier, or any combination thereof for the set of CCs, and perform or receiving a transmission using of the plurality of CCs configured based on the control message.

Some examples of the method, apparatuses, and non-transitory computer-readable medium described herein may further include operations, features, means, or instructions for selecting the active TCI state for the set of CCs based on a control resource set identifier that may be common to the set of CCs, where the control message indicates the active TCI state for the set of CCs and a CC identifier of the set of CCs.

Some examples of the method, apparatuses, and non-transitory computer-readable medium described herein may further include operations, features, means, or instructions for selecting the active TCI state for the set of CCs based on a common active TCI state for the set of CCs, where the control message indicates the active TCI state for the set of CCs and an unspecified CC identifier.

Some examples of the method, apparatuses, and non-transitory computer-readable medium described herein may further include operations, features, means, or instructions for selecting the active TCI state for the set of CCs based on a frequency band common to the set of CCs, where the control message indicates the active TCI state for the set of CCs.

Some examples of the method, apparatuses, and non-transitory computer-readable medium described herein may further include operations, features, means, or instructions for selecting the set of active TCI states for a shared channel of a first set of BWP CC pairs, each of the first set of BWP CC pairs may be associated with a same set of configured candidate TCI states, where the control message indicates the set of active TCI states and a CC identifier of the set of CCs.

Some examples of the method, apparatuses, and non-transitory computer-readable medium described herein may further include operations, features, means, or instructions for selecting the set of active TCI states for a shared channel of a first set of BWP CC pairs, each of the first set of BWP CC pairs may be associated with a same set of configured candidate TCI states, where the control message indicates the set of active TCI states and an unspecified CC identifier.

Some examples of the method, apparatuses, and non-transitory computer-readable medium described herein may further include operations, features, means, or instructions for selecting the set of active TCI states for a shared channel of a first set of BWP CC pairs, each of the first set of BWP CC pairs may be associated with a same frequency band, where the control message indicates the set of active TCI states.

Some examples of the method, apparatuses, and non-transitory computer-readable medium described herein may further include operations, features, means, or instructions for selecting the spatial relation RS identifier for a SRS of a first set of BWP CC pairs, each of the first set of BWP CC pairs may be associated with a same set of configured candidate TCI states, where the control message indicates the spatial relation RS identifier and a BWP CC pair.

Some examples of the method, apparatuses, and non-transitory computer-readable medium described herein may further include operations, features, means, or instructions for selecting the spatial relation RS identifier for a SRS of a first set of BWP CC pairs, each of the first set of BWP CC pairs may be associated with a same set of configured candidate TCI states, where the control message indicates the spatial relation RS identifier and an unspecified BWP CC pair.

Some examples of the method, apparatuses, and non-transitory computer-readable medium described herein may further include operations, features, means, or instructions for selecting the spatial relation RS identifier for a SRS of a first set of BWP CC pairs, each of the first set of BWP CC pairs may be associated with a same frequency band, where the control message indicates the spatial relation RS identifier and an unspecified BWP CC pair.

In some examples of the method, apparatuses, and non-transitory computer-readable medium described herein, a format of the control message corresponds to a TCI selection format for indicating the active TCI state, the set of active TCI states, the spatial relation RS identifier, or any combination thereof for the set of CCs.

Some examples of the method, apparatuses, and non-transitory computer-readable medium described herein may further include operations, features, means, or instructions for transmitting an indication of the set of CCs or a set of BWP CC pairs for configuration according to the active TCI state, the set of active TCI states, or the spatial relation RS identifier, where the indication may be separate from the control message.

Some examples of the method, apparatuses, and non-transitory computer-readable medium described herein may further include operations, features, means, or instructions for receiving, from the UE, an indication of a group of CCs or a set of BWP CC pairs configured for the UE that may be spatially quasi-located, and identifying the set of CCs based on the indication of the group of CC or the set of BWP CC pairs.

In some examples of the method, apparatuses, and non-transitory computer-readable medium described herein, the control message includes a MAC-CE.

DETAILED DESCRIPTION

Figure 1:
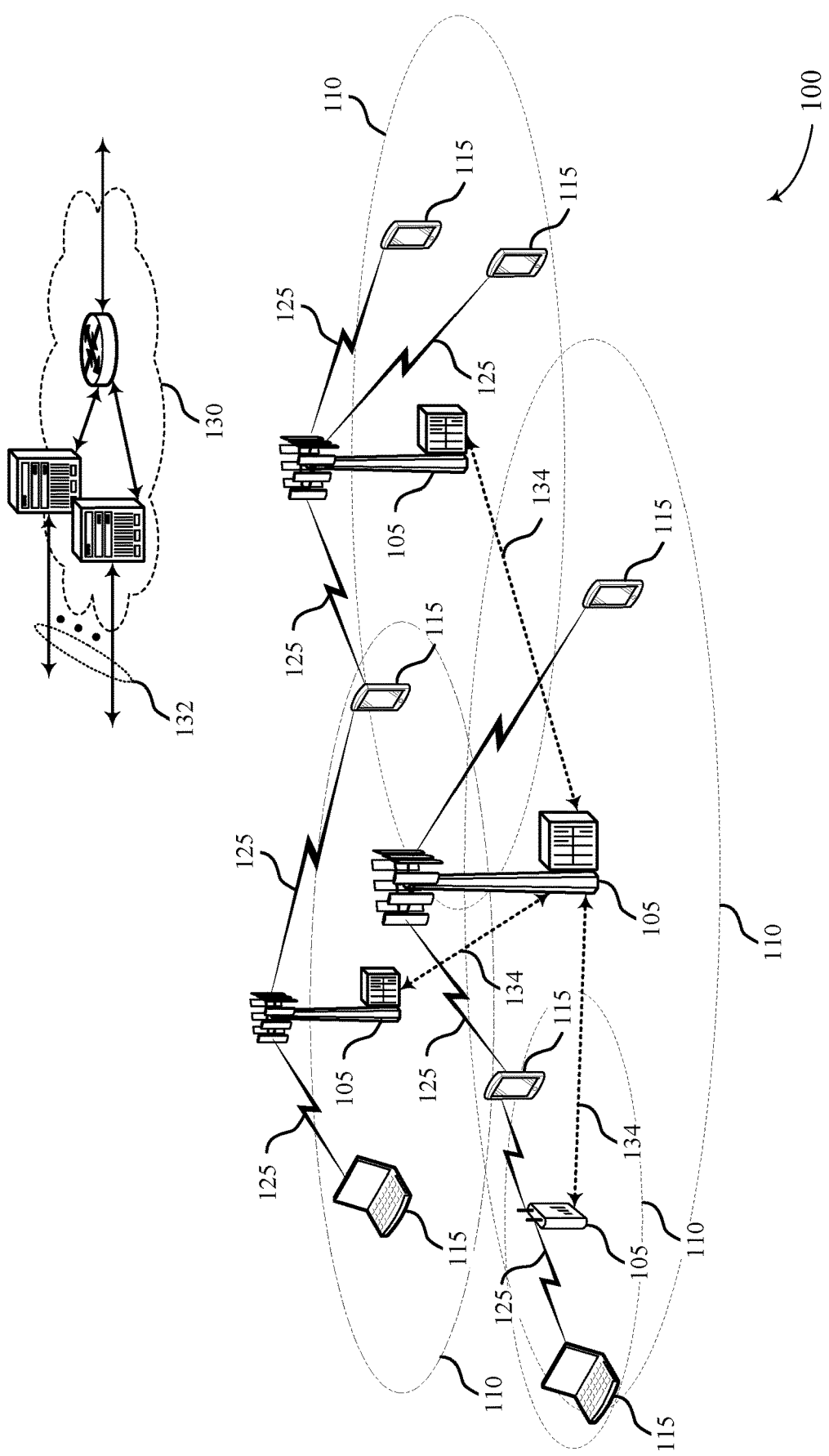
FIGS. 1 through 4 illustrate examples of a wireless communications system that supports communication configuration for multiple component carriers (CCs) in accordance with aspects of the present disclosure.

A wireless communications system, such as a New Radio (NR) system, may support carrier aggregation using multiple component carrier (CCs). For example, a communication link in the system may support transmissions using multiple CCs. For instance, up to 16 uplink CCs and up to 16 downlink CCs may be used for carrier aggregation.

In some systems, one medium access control (MAC) control element (MAC-CE) may be used to change the transmission configuration indicator (TCI) state for a control resource set (CORESET) in a CC or serving cell. When CCs share the same analog beam in the same frequency band (e.g., are spatially quasi co-located (QCLed)), up to 16 MAC-CEs may be needed to select a same TCI state identifier (ID) for the same CORESET ID in every CC (e.g., in downlink NR-NR carrier aggregation). The use of this number of MAC-CEs may lead to an increase in signaling overhead between the UE and the base station. In order to reduce the number of MAC-CEs used for conveying the TCI state ID for the same CORESET ID in each CC that is spatially QCLed, a single MAC-CE command may be used to select a TCI state for a CORESET ID, which may be applied to multiple CCs.

In another example, a MAC-CE may be used to change the set of active TCI states for data communications (e.g., a physical downlink shared channel (PDSCH) or a physical uplink shared channel (PUSCH)) in a bandwidth part (BWP) of a CC or serving cell. When CCs share the same analog beam in the same frequency band (e.g., are spatially QCLed), up to 16 MAC-CEs may be used to select the same set of active TCI states in the active BWP in every CC (e.g., in downlink NR-NR carrier aggregation), which may result in increased signaling overhead between UE and base station. In order to reduce the number of MAC-CEs used for conveying the set of active TCI states for the same active BWP in each CC that is spatially QCLed, a single MAC-CE command may be used to select a set of active TCI states for PDSCH that may be applied to multiple pairs (e.g., uplink and downlink pair of CCs) of BWP CCs.

Further, in some cases, a MAC-CE may be used to change the spatial relation per sounding reference signal (SRS) resource in an SRS resource set in a BWP of a CC or serving cell. When CCs share the same analog beam in the same frequency band (e.g., are spatially QCLed), up to 16 MAC-CEs may be used to select the same spatial relation for the same SRS resource in the active BWP in every CC (e.g., in uplink NR-NR carrier aggregation), which may increase overhead. In order to reduce the number of MAC-CEs used to convey the spatial relation for the same SRS resource in the same active BWP in each CC that is spatially QCLed, a single MAC-CE command may be used to select the spatial relation for one SRS resource that may be applied to multiple pairs (e.g., uplink and downlink pair of CCs) of BWP CCs.

Aspects of the disclosure are initially described in the context of wireless communications systems. Aspects are then described with respect to a process flow. Aspects of the disclosure are further illustrated by and described with reference to apparatus diagrams, system diagrams, and flowcharts that relate to communication configuration for multiple CCs.

FIG. 1 illustrates an example of a wireless communications system 100 that supports communication configuration for multiple CCs in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or an NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals (RSs), beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal the UE 115 received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, RSs, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink CCs according to a carrier aggregation configuration. Carrier aggregation may be used with both FDD and TDD CCs.

In some cases, wireless communications system 100 may utilize enhanced CCs (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Base station 105 may identify an active TCI state, a set of active TCI states, and/or a spatial relation RS identifier to be used for multiple CCs configured for a UE 115. Base station 105 may transmit a control message (e.g., MAC-CE) to UE 115, which may indicate the identified active TCI state, set of active TCI states, and/or spatial relation RS identifier to be used for multiple CCs of UE 115. Additionally or alternatively, base station 105 may optionally transmit a shared command indication (e.g., MAC-CE or RRC) to UE 115 that indicates which CCs and/or BWPs may also follow the indication transmitted in the control message.

UE 115 may determine a communication configuration for a CC of the plurality of CC based on the control message and optional shared command indication. Based on the determination, UE 115 may optionally apply a TCI state to subset of CCs, apply a set of active TCI states to a set of BWP CCs pairs, or configure an SRS for each BWP CCs pair. UE 115 may transmit to or receive communication from base station 105 based on the applied configuration.

Figure 2:
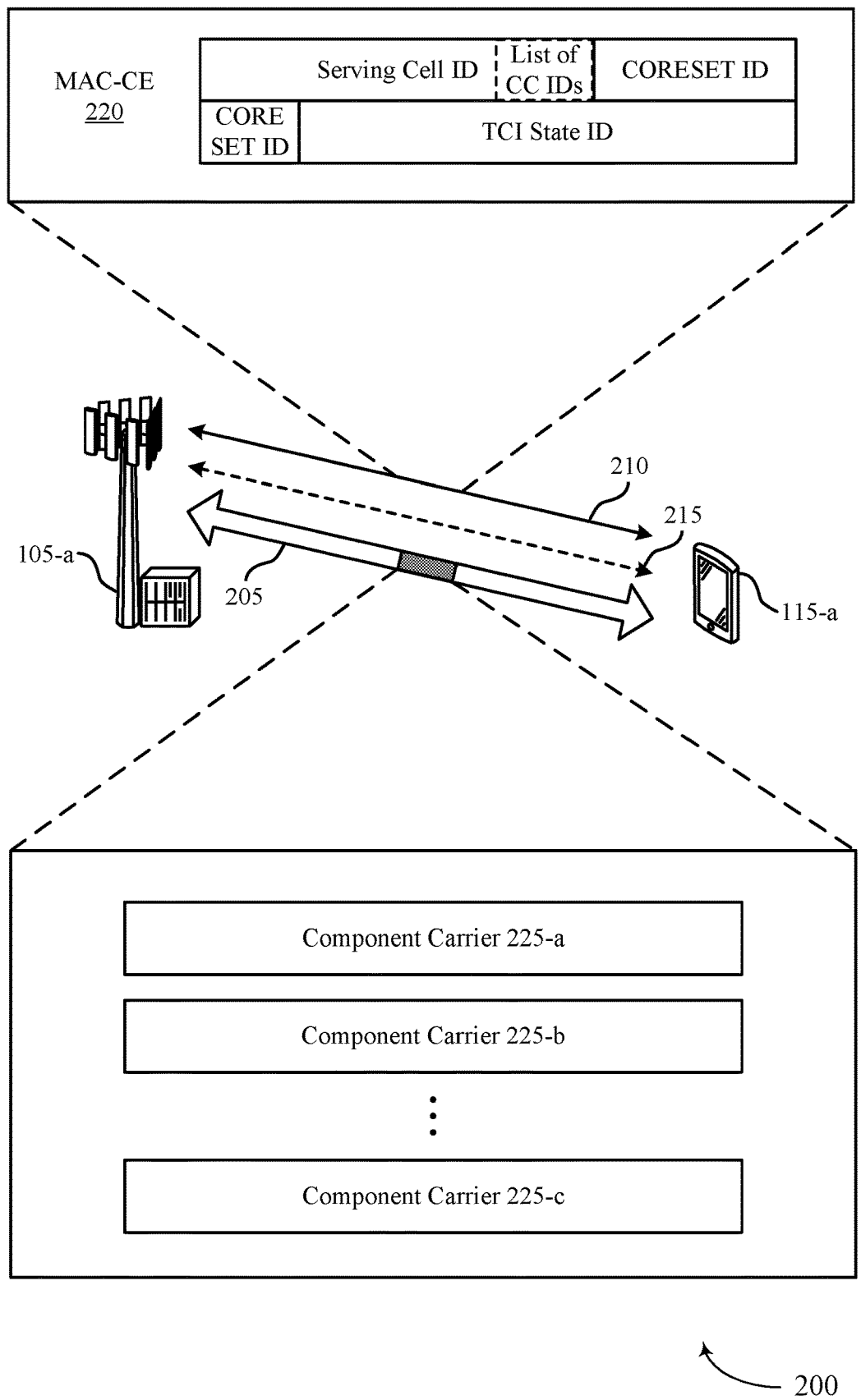

FIG. 2 illustrates an example of a wireless communications system 200 that supports communication configuration for multiple CCs in accordance with aspects of the present disclosure. In some examples, wireless communications system 200 may implement aspects of wireless communications system 100. For example, wireless communications system 200 includes base station 105-*a* and UE 115-*a*, which may be examples of the corresponding devices described with reference to FIG. 1.

Wireless communications system 200 may support carrier aggregation using multiple CCs 225. UE 115-*a* and base station 105-*a* may communicate over links 205, 210, and optionally 215. For example, link 205 may support communication using CCs 225-*a*, 225-*b*, and 225-*c*, and additional CCs 225 may be used on link 205. For instance, up to 16 uplink CCs 225 and up to 16 downlink CCs 225 may be used for carrier aggregation on link 205. In some systems, one MAC-CE 220 may be used to change the TCI state for a CORESET in a CC 225 or serving cell. When CCs 225 share the same analog beam in the same frequency band (e.g., are spatially QCLed), up to 16 MAC-CEs 220 may be used to select same TCI state ID for the same CORESET ID in every CC 225 (e.g., in downlink NR-NR carrier aggregation), which may increase signaling overhead between UE 115-*a* and base station 105-*a*. In order to reduce the number of MAC-CEs 220 for conveying the TCI state ID for the same CORESET ID in each CC 225 spatially QCLed, a single MAC-CE 220 may be used to select a TCI state for a CORESET ID, which may be applied to multiple CCs 225.

For example, a same TCI state ID may be selected (e.g., by base station 105-*a*) for the same CORESET ID in each of multiple CCs 225. In some cases, an indication of the TCI state ID may be implicit and may be based on MAC-CE 220. Base station 105-*a* may transmit an implicit MAC-CE 220 indication that may be a MAC-CE 220 that identifies a TCI state ID for a CORESET ID of a specified CC 225 or of multiple CCs 225. UE 115-*a* may apply the indicated TCI state ID to the identified CC 225. UE 115-*a* may also identify other CCs 225 that are configured with the same TCI states as the CC 225 indicated in the MAC-CE 220, and the UE 115-*a* may also apply the indicated TCI state ID to the additional CCs 225 having the same TCI state even though the additional CCs are not explicitly specified in the MAC-CE 220. The TCI state ID may be applied to the additional CCs 225 at least for the physical downlink control channel (PDCCH) (e.g., the PDCCH corresponding to the CORESET ID). Additionally or alternative, an implicit MAC-CE 220 indication may be transmitted by base station 105-*a* and may include a MAC-CE 220 that identifies a TCI state ID for a CORESET ID of an unspecified CC 225 (e.g., the serving cell ID is not specified in MAC-CE 220). In such cases, UE 115-*a* may apply the indicated TCI state ID to all CCs 225 with the same configured TCI states at least for the PDCCH. In some examples, UE 115-*a* may apply an indicated TCI state ID to all CCs 225 in the same frequency band independent of the inclusion of an ID of a specified CC 225 in the MAC-CE 220.

According to some aspects, an indication of the TCI state ID may be explicitly transmitted from the base station 105-*a* to UE 115-*a*. For instance, a MAC-CE 220 may be formatted to include CORESET TCI selection using a list of the set of CCs to which the indicated TCI state ID is to be applied. UE 115-*a* may receive the list of CC IDs in MAC-CE 220 and apply the indicated TCI state ID to the CCs 225 indicated by the list. In another example, the set of CCs 225 sharing same MAC-CE 220 command is indicated outside or separate from the MAC-CE 220. For example, link 215 may be used by base station 105-*a* for transmission of RRC signaling or a separate control message (e.g., a separate MAC-CE) that indicates the set of CCs to share the MAC-CE 220. In some cases, MAC-CE 220 command on link 210 for CORESET TCI selection may still be used by UE 115-*a*. If UE 115-*a* reports one or more groups of spatially QCLed CCs 225 prior to the transmission of MAC-CE 220, base station 105-*a* may indicate, in MAC-CE 220, that the set of CCs sharing the same MAC-CE 220 is a previously reported group of spatially QCL CCs 225 or at least a subset of the one or more groups of spatially QCLed CCs 225 reported by the UE 115-*a*.

UE 115-*a* may then receive downlink control information (e.g., via PDCCH) from base station 105-*a* in accordance with the indicated TCI state ID (e.g., using the same configured beam or other transmission parameters) for one or more CCs 225 after applying the TCI state ID indicated in the MAC-CE 220 or via link 215.

Figure 3:
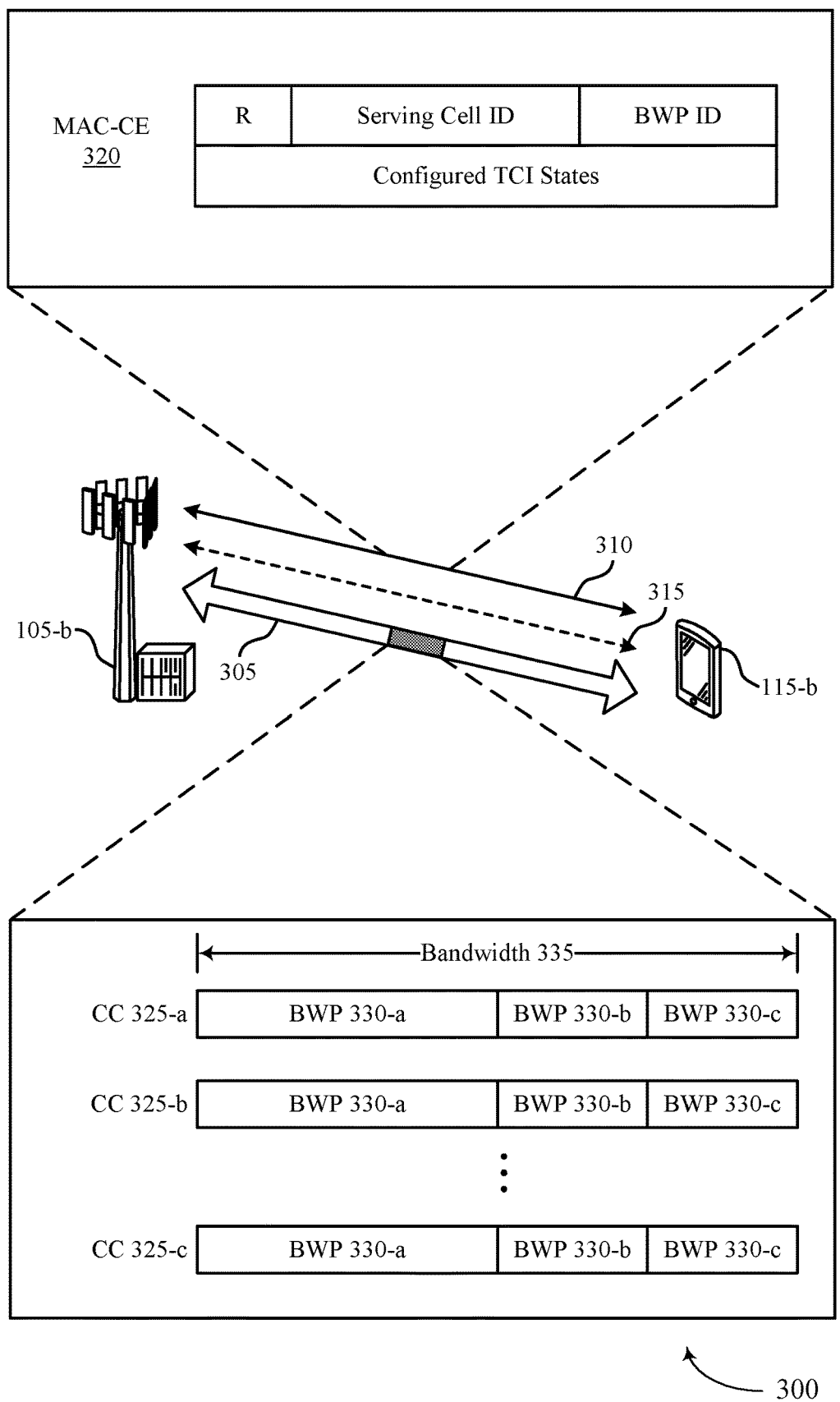

FIG. 3 illustrates an example of a wireless communications system 300 that supports communication configuration for multiple CCs in accordance with aspects of the present disclosure. In some examples, wireless communications system 300 may implement aspects of wireless communications systems 100 or 200. For example, wireless communications system 300 includes base station 105-*b* and UE 115-*b*, which may be examples of the corresponding devices described with reference to FIGS. 1 and 2.

Wireless communications system 300 may support carrier aggregation using multiple CCs 325. UE 115-*b* and base station 105-*b* may communicate over links 305, 310, and optionally 315. For example, link 305 may support communication using CCs 325-*a*, 325-*b*, and 325-*c*, and additional CCs 325 may also be supported on link 305 (e.g., 16 uplink CCs 325 or 16 downlink CCs 325 may be used for carrier aggregation on link 305). In some systems, a MAC-CE 320 may be used to change the set of active TCI states for data communications (e.g., PDSCH, PUSCH) in a BWP 330 of a CC 325 or serving cell. When CCs 325 share the same analog beam in the same frequency band (e.g., are spatially QCLed), up to 16 MAC-CEs 320 may be used to select the same set of active TCI states in the active BWP 330 in every CC 325 (e.g., in downlink NR-NR carrier aggregation), which may increase signaling overhead between UE 115-*b* and base station 105-*b*. In order to reduce the number of MAC-CEs 320 used to convey the set of active TCI states for the same active BWP 330 in each CC 325 spatially QCLed, a single MAC-CE 320 may be used to select a set of active TCI states for PDSCH that may be applied to multiple BWP 330 CC 325 pairs (e.g., uplink and downlink pair of CCs 325).

For example, a same set of TCI state IDs may be activated for downlink data (e.g., PDSCH) in each of multiple BWP CC pairs. In some cases, an indication of the set of active TCI states may be implicit and may be based on MAC-CE 320. Base station 105-*b* may transmit an implicit MAC-CE 320 indication that may include a MAC-CE 320 that identifies a set of active TCI states for a specified BWP 330 of a specified CC 325. UE 115-*b* may apply the indicated set of active TCI states to the identified BWP 330 of CC 325. UE 115-*b* may also identify additional BWPs 330 of CCs 325 that are configured with the same TCI states as the BWP 330 of CC 325 indicated in the MAC-CE 320. In some cases, the UE 115-*b* may further apply the indicated set of active TCI states to the additional BWPs 330 of CCs 325 that were not specified in the MAC-CE 320. The set of active TCI states may be applied to the additional BWPs 330 of CCs 325 at least for the PDSCH. Additionally or alternatively, an implicit MAC-CE 320 indication may be transmitted by base station 105-*b* and may include a MAC-CE 320 that identifies a set of active TCI states for an unspecified BWP 330 (e.g., the BWP ID is not specified in the MAC-CE 320) and/or CC 325 (e.g., the serving cell ID is not specified in the MAC-CE 320). UE 115-*b* may apply the indicated set of active TCI states to all BWPs 330 of CCs 325 with the same configured TCI states at least for PDSCH. In some examples, UE 115-*b* may apply an indicated set of active TCI states to all BWPs 330 of CCs 325 in the same frequency band independent of the inclusion of a specified BWP ID and/or CC ID in the MAC-CE 320.

According to some aspects, an indication of the set of active TCI states may be explicitly transmitted from the base station 105-*b* to UE 115-*b*. For instance, a MAC-CE 320 may be formatted to include the set of active TCI states selection using a list of the set of BWPs 330 of CCs 325 to which the set of active TCI states is to be applied. UE 115-*b* may receive the list of BWP IDs and/or CC IDs in MAC-CE 320 and apply the indicated set of active TCI states to the corresponding BWPs 330 of CCs 325. In another example, the set of BWPs 330 of CCs 325 sharing same MAC-CE 320 command is indicated outside or separate from the MAC-CE 320 command. For example, link 315 may be used by base station 105-*b* for transmission of RRC signaling or a separate control message (e.g., a separate MAC-CE) that indicates the set of BWP CC pairs to share the MAC-CE 320. In some cases, MAC-CE 320 command on link 310 for active set of TCI states selection for PDSCH may still be used by UE 115-*b*. If UE 115-*b* reports one or more groups of spatially QCLed CCs 325 prior to the transmission of MAC-CE 320, base station 105-*b* may indicate in MAC-CE 320 that the set of BWPs 330 of CCs 325 sharing the same MAC-CE 320 command is a previously reported group of spatially QCL CCs 325 or at least a subset of the one or more groups of spatially QCLed CCs 325 reported by the UE 115-*b*.

UE 115-*b* may then receive downlink data (e.g., via PDSCH) from base station 105-*b* in accordance with the indicated set of active TCI states (e.g., using the same configured beam or other transmission parameters) for one or more BWPs 330 of CCs 325 after applying the set of active TCI states indicated in the MAC-CE 320 or via link 315.

Figure 4:
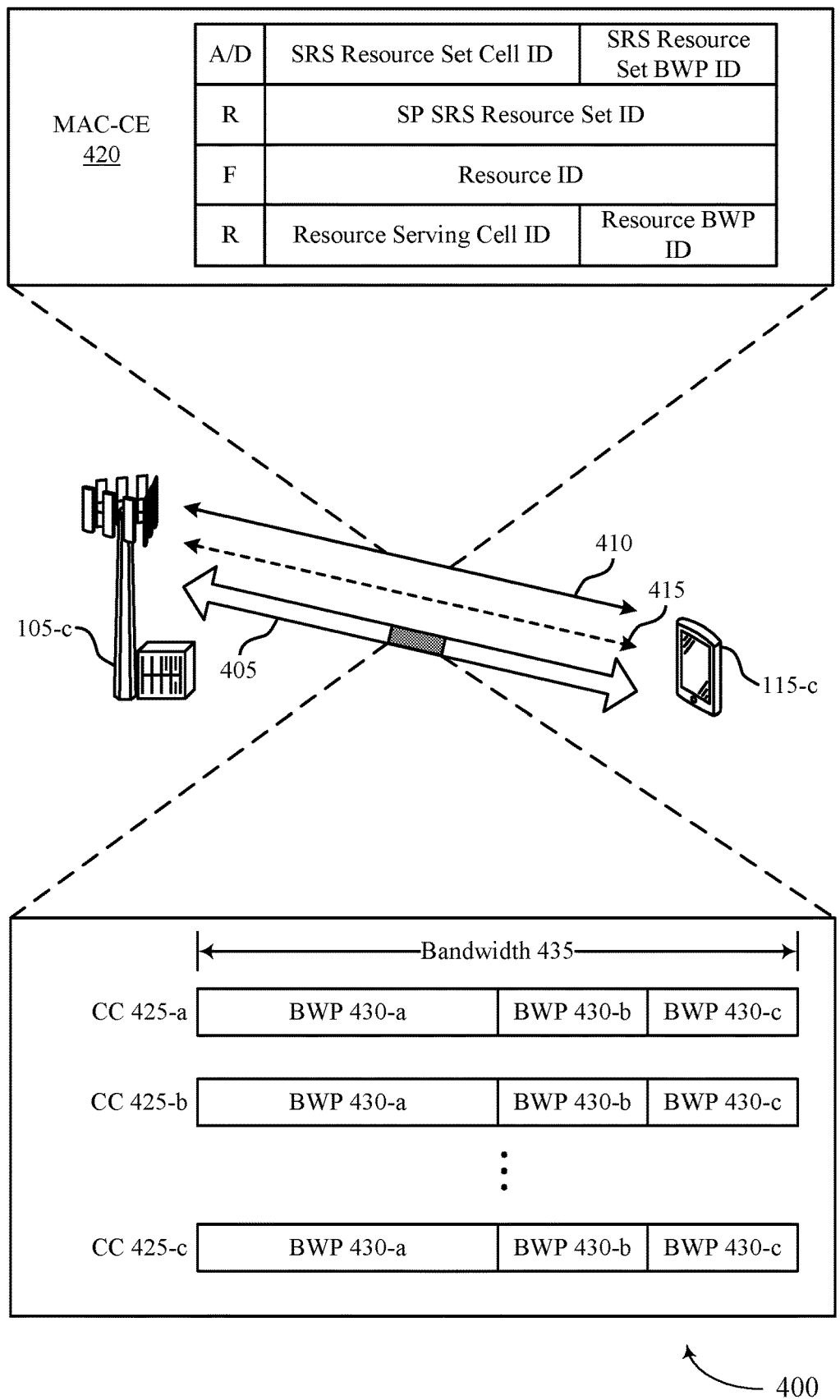

FIG. 4 illustrates an example of a wireless communications system 400 that supports communication configuration for multiple CCs in accordance with aspects of the present disclosure. In some examples, wireless communications system 400 may implement aspects of wireless communications systems 100, 200, or 300. For example, wireless communications system 400 includes base station 105-*c* and UE 115-*c*, which may be examples of the corresponding devices described with reference to FIGS. 1, 2, and 3.

Wireless communications system 400 may support carrier aggregation using multiple CCs 425. UE 115-*c* and base station 105-*c* may communicate over links 405, 410, and optionally 415. For example, link 405 may support communication of CCs 425-*a*, 425-*b*, and 425-*c*, and additional CCs 425 may be supported on link 405 (e.g., 16 uplink CCs 425 and 16 downlink CCs 425 may be used for carrier aggregation on link 405). In some systems, a MAC-CE 420 may be used to change the spatial relation per SRS resource in a semi persistent (SP), periodic, or aperiodic SRS resource set in a BWP 430 of a CC 425 or serving cell. When CCs 425 share the same analog beam in the same frequency band (e.g., are spatially QCLed), respective MAC-CEs 420 may be used to select the same spatial relation for the same SRS resource in the active BWP 430 in each CC 425 (e.g., in uplink NR-NR carrier aggregation), which may increase signaling overhead between UE 115-*c* and base station 105-*c*. In order to reduce the number of MAC-CEs 420 to convey the spatial relation for the same SRS resource in the same active BWP 430 in each CC 425 spatially QCLed, a MAC-CE 420 command may be used to select the spatial relation for one SRS resource that may be applied to multiple BWP 430 CC 425 pairs (e.g., uplink and downlink pair of CCs 425). In some cases, SRS may be periodic, SP, or aperiodic SRS.

For example, a same spatial relation RS ID is used for the same SRS resource ID in each of the multiple pairs of BWP 430 of CCs 425 that are QCLed. If BWP 430 or CC 425 ID is unspecified for a spatial relation RS ID, the spatial relation RS ID is the applied BWP 430 of CC 425. In some cases, an indication of the same spatial relation for an SRS resource may be implicit and may be based on MAC-CE 420. Base station 105-*c* may transmit an implicit MAC-CE 420 indication that may include a MAC-CE 420 that identifies the same spatial relation for an SRS resource for a specified BWP 430 of a specified CC 425. UE 115-*c* may apply the indicated spatial relation for the SRS resource to the identified BWP 430 of CC 425. UE 115-*c* may also identify additional BWPs 430 of CCs 425 that are configured with the same TCI states for PDSCH as the BWP 430 of CC 425 indicated in the MAC-CE 420. In some cases, the UE 115-*c* may also apply the same spatial relation for the SRS resource to the additional BWPs 430 of CCs 425 that were not specified in the MAC-CE 420. The same spatial relation for an SRS resource may be applied to the additional BWPs 430 of CCs 425 at least for the physical uplink control channel (PUCCH). Additionally or alternatively, an implicit MAC-CE 420 indication may be transmitted by base station 105-*c* and may include a MAC-CE 420 that identifies the spatial relation for a SRS resource for an unspecified BWP 430 (e.g., the BWP ID is not specified in MAC-CE 420) and/or CC 425 (e.g., the serving cell ID is not specified in MAC-CE 420). UE 115-*c* may apply the indicated spatial relation for the SRS resource to all BWPs 430 of CCs 425 with the same configured TCI states for PDSCH at least for PUCCH. In some examples, UE 115-*c* may apply an indicated spatial relation for an SRS resource to all BWPs 430 of CCs 425 in the same frequency band independent of the inclusion of a specified BWP ID and/or CC ID in the MAC-CE 420.

An indication of the spatial relation for an SRS resource may be explicitly transmitted from the base station 105-*c* to UE 115-*c*. For instance, a MAC-CE 420 may be formatted to include the spatial relation for an SRS resource selection using a list of the set of BWPs 430 of CCs 425 to which the spatial relation for an SRS resource is to be applied. UE 115-*c* may receive the list of BWP IDs and/or CC IDs in MAC-CE 420 and apply the indicated spatial relation for an SRS resource to the corresponding BWPs 430 of CCs 425. In another example, the set of BWPs 430 of CCs 425 sharing same MAC-CE 420 command is indicated outside or separate from (e.g., by link 415) the MAC-CE 420 command. For example, link 415 may be used by base station 105-*c* for transmission of RRC signaling or a separate control message (e.g., a separate MAC-CE) that indicates the set of BWP CC pairs to share the MAC-CE 420. In some cases, MAC-CE 420 command via link 410 for SRS spatial relation selection may still be used by UE 115-*c*. If UE 115-*c* reports one or more groups of spatially QCLed CCs 425 prior to the transmission of MAC-CE 420, base station 105-*c* may indicate in MAC-CE 420 that the set of BWPs 430 of CCs 425 sharing the same MAC-CE 420 command is a previously reported group of spatially QCL CCs 425 or at least a subset of the one or more groups of spatially QCLed CCs 425 reported by the UE 115-*c*.

UE 115-*c* may then transmit uplink RSs (e.g., SRS on the PUCCH) to base station 105-*c* using the indicated spatial relation for the SRS resource(s) for one or more BWPs 430 of CCs 425 after applying the spatial relation indicated in the MAC-CE or via link 415.

Figure 5:
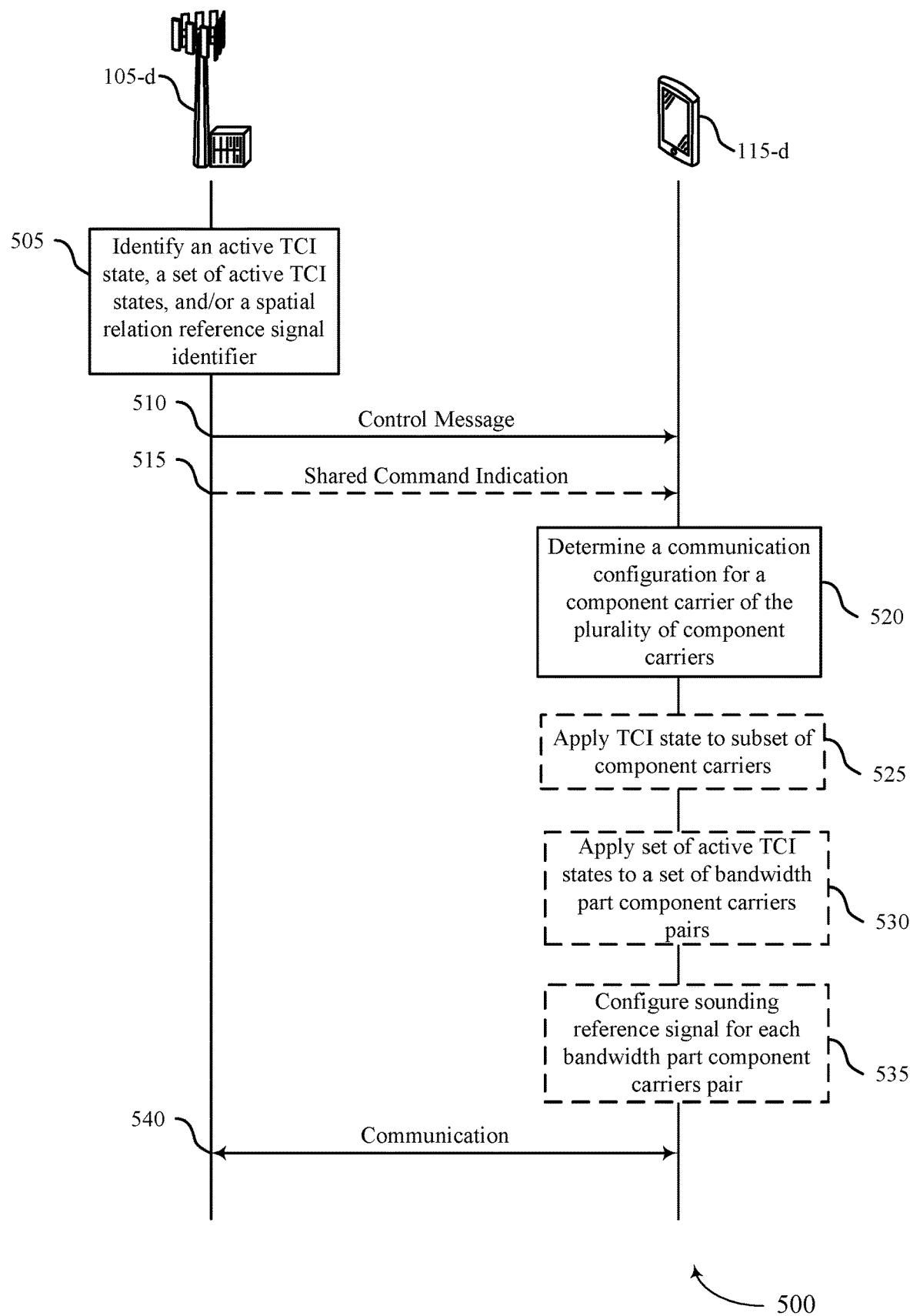
FIG. 5 illustrates an example of a process flow that supports communication configuration for multiple CCs in accordance with aspects of the present disclosure.

FIG. 5 illustrates an example of a process flow 500 that supports communication configuration for multiple CCs in accordance with aspects of the present disclosure. In some examples, process flow 500 may implement aspects of wireless communications systems 100, 200, 300, or 400. Process flow 500 may include base station 105-d and UE 115-d, which may be examples of the corresponding devices described with reference to FIGS. 1 through 4.

At 505, base station 105-d may identify an active TCI state, a set of active TCI states, and/or a spatial relation RS identifier to be used for multiple CCs (or BWP CC pairs) of UE 115-d.

At 510, base station 105-d may transmit a control message (e.g., MAC-CE) to UE 115-d. The control message may indicate the identified active TCI state, set of active TCI states, and/or spatial relation RS identifier to be used for multiple CCs (or BWP CC pairs) configured for UE 115-d.

At 515, base station 105-d may optionally transmit a shared command indication (e.g., MAC-CE or RRC) to UE 115-d that indicates which CCs (or BWP CC pairs) may also follow the indication transmitted in the control message 510.

At 520, UE 115-d may determine a communication configuration for a CC (or a BWP CC pair) of the multiple CCs (or BWP CC pairs) based on the control message and optional shared command indication.

At 525, UE 115-d may optionally apply the TCI state to multiple CCs including the CC based on the determination at 520.

At 530, UE 115-d may optionally apply a set of active TCI states to a set of BWP CCs pairs based on the determination at 520.

At 535, UE 115-d may optionally configure an SRS for each BWP CC pair based on the determination at 520.

At 540, UE 115-d may transmit to or receive communications from base station 105-d based on the determination at 520 and the optionally applied configurations.

Figure 6:
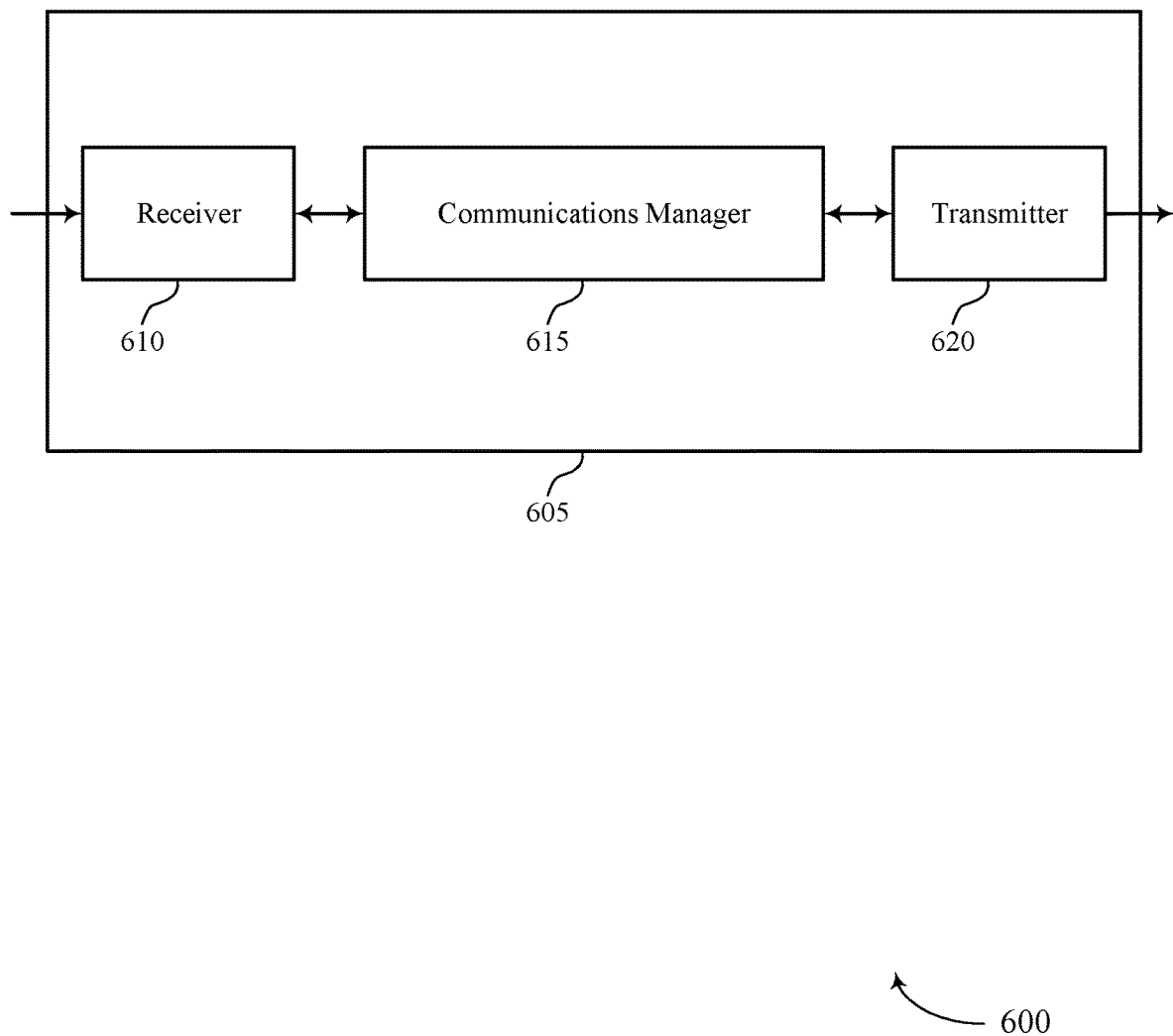
FIGS. 6 and 7 show block diagrams of devices that support communication configuration for multiple CCs in accordance with aspects of the present disclosure.

FIG. 6 shows a block diagram 600 of a device 605 that supports communication configuration for multiple CCs in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to communication configuration for multiple CCs, etc.). Information may be passed on to other components of the device 605. The receiver 610 may be an example of aspects of the transceiver 920 described with reference to FIG. 9. The receiver 610 may utilize a single antenna or multiple antennas.

The communications manager 615 may receive a control message from a base station that indicates, for a set of CCs configured for the UE, one or more of: an active TCI state, a set of active TCI states, or a spatial relation RS identifier, determine a communication configuration for at least one CC of the set of CCs based on the control message, and perform or receive a transmission using the at least one CC based on the communication configuration. The actions performed by the communications manager 615 as described herein may be implemented to realize one or more potential advantages. One implementation may allow a UE 115 to save power and increase battery life by avoiding having to receive excessive MAC-CE signaling to schedule the same resources or apply the same TCI state for multiple CCs (or BWP CC pairs). Another implementation may provide improved quality and reliability of service at the UE 115, as latency and the number of separate resources allocated to the UE 115 may be reduced. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or multiple antennas.

Figure 7:
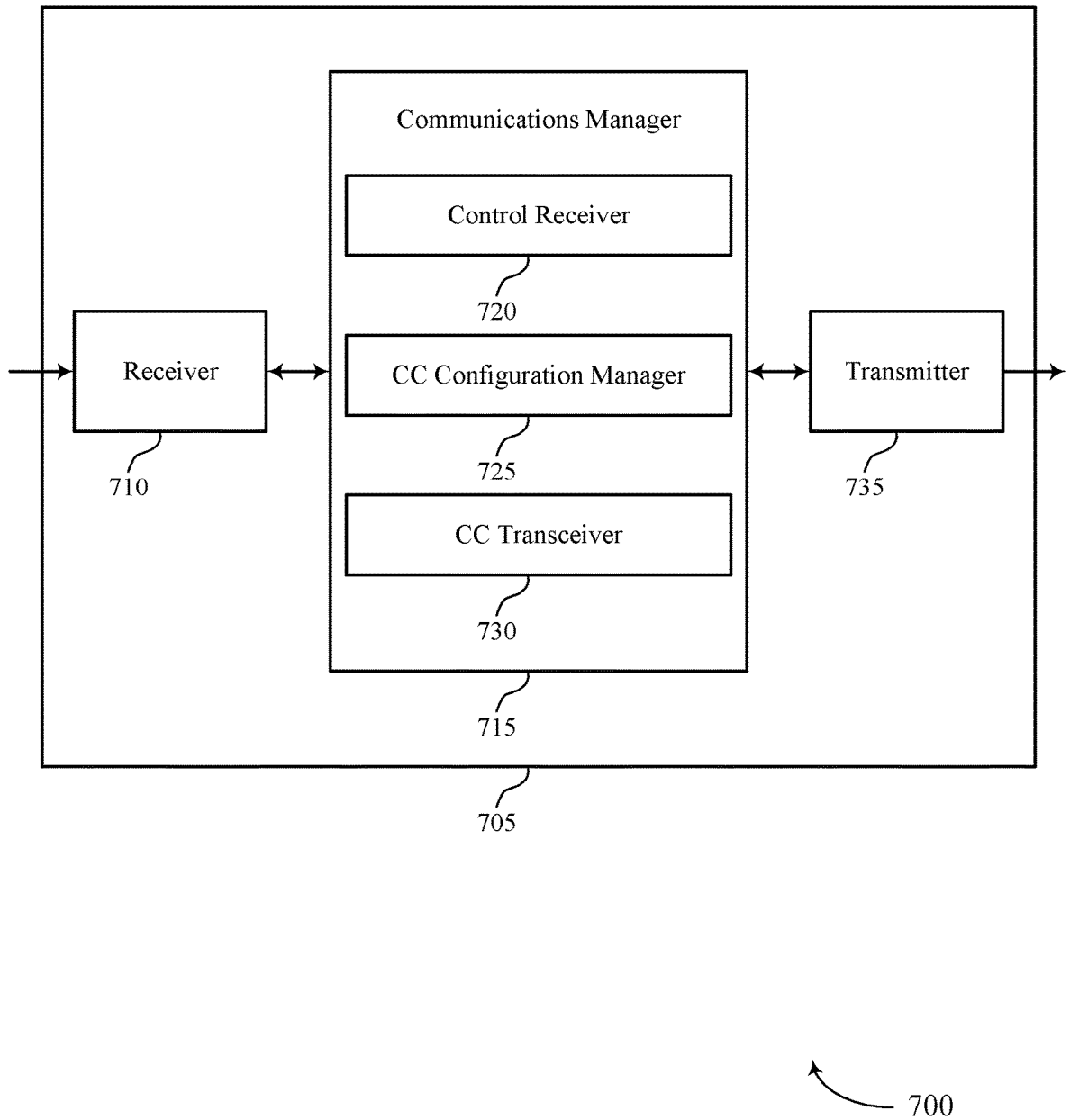

FIG. 7 shows a block diagram 700 of a device 705 that supports communication configuration for multiple CCs in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to communication configuration for multiple CCs, etc.). Information may be passed on to other components of the device 705. The receiver 710 may be an example of aspects of the transceiver 920 described with reference to FIG. 9. The receiver 710 may utilize a single antenna or multiple antennas.

The communications manager 715 may be an example of aspects of the communications manager 615 as described herein. The communications manager 715 may include a control receiver 720, a CC configuration manager 725, and a CC transceiver 730. The communications manager 715 may be an example of aspects of the communications manager 910 described herein.

The control receiver 720 may receive a control message from a base station that indicates, for a set of CCs configured for the UE, one or more of: an active TCI state, a set of active TCI states, or a spatial relation RS identifier.

The CC configuration manager 725 may determine a communication configuration for at least one CC of the set of CCs based on the control message.

The CC transceiver 730 may perform or receive a transmission using the at least one CC based on the communication configuration.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or multiple antennas.

Figure 8:
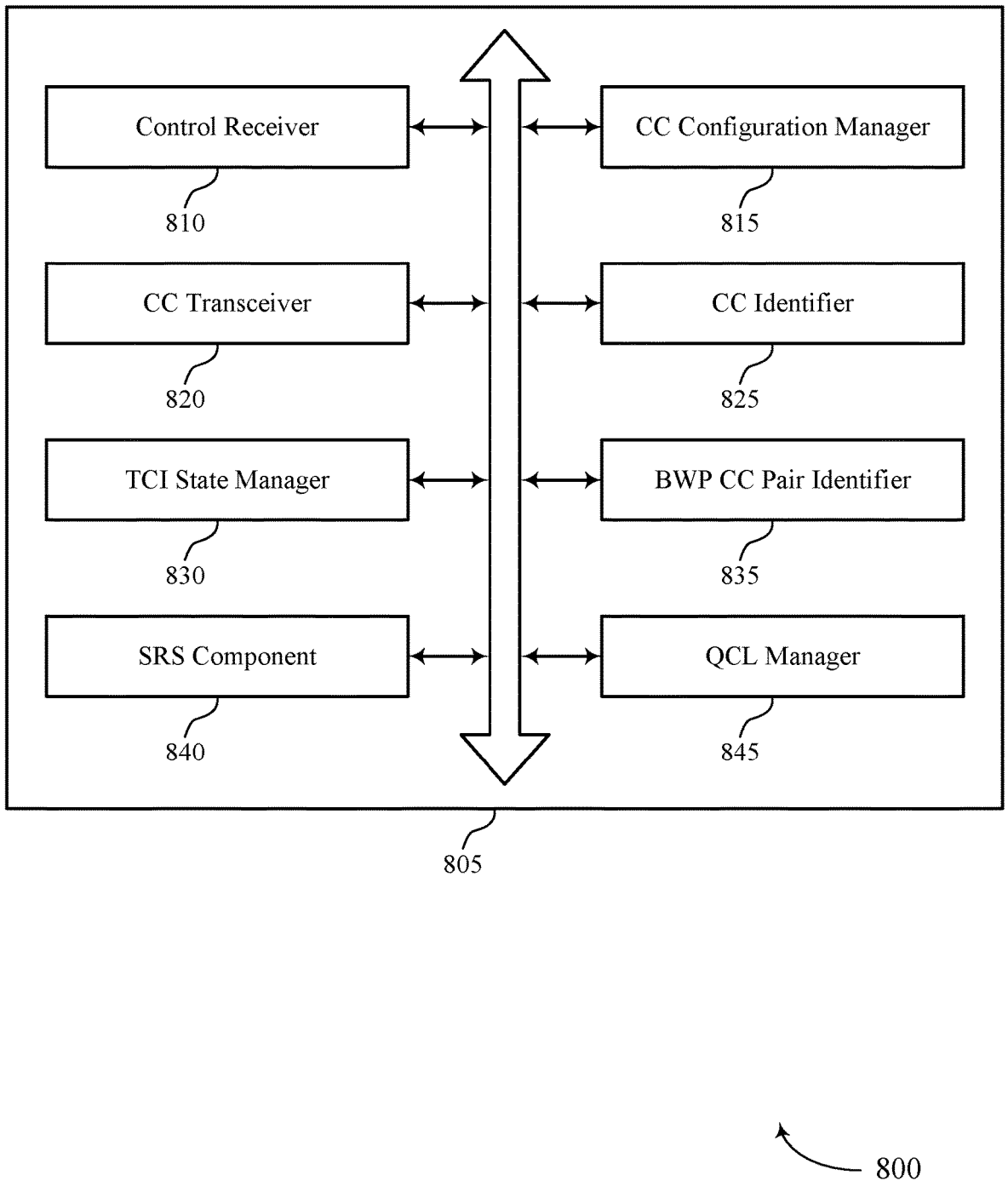
FIG. 8 shows a block diagram of a communications manager that supports communication configuration for multiple CCs in accordance with aspects of the present disclosure.

FIG. 8 shows a block diagram 800 of a communications manager 805 that supports communication configuration for multiple CCs in accordance with aspects of the present disclosure. The communications manager 805 may be an example of aspects of a communications manager 615, a communications manager 715, or a communications manager 910 described herein. The communications manager 805 may include a control receiver 810, a CC configuration manager 815, a CC transceiver 820, a CC identifier 825, a TCI state manager 830, a BWP CC pair identifier 835, an SRS component 840, and a QCL manager 845. Each of these modules may communicate, directly or indirectly, with one another (e.g., via one or more buses).

The control receiver 810 may receive a control message from a base station that indicates, for a set of CCs configured for the UE, one or more of: an active TCI state, a set of active TCI states, or a spatial relation RS identifier. In some examples, the control receiver 810 may receive an indication of the set of CCs or a set of BWP CC pairs for configuration according to the active TCI state, the set of active TCI states, or the spatial relation RS identifier, where the indication is separate from the control message. In some cases, the control message includes a MAC-CE.

The CC configuration manager 815 may determine a communication configuration for at least one CC of the set of CCs based on the control message. In some examples, the CC configuration manager 815 may identify the set of CCs or a set of BWP CC pairs for configuration according to the active TCI state, the set of active TCI states, or the spatial relation RS identifier based on a format of the control message, where the format corresponds to a TCI selection format.

The CC transceiver 820 may perform or receive a transmission using the at least one CC based on the communication configuration.

The CC identifier 825 may identify a control resource set identifier that is common to a subset of CCs of the set of CCs based on the control message. In some examples, the CC identifier 825 may identify a second subset of CCs of the set of CCs, where each CC of the second subset of CCs is associated with a same set of configured candidate TCI states as each CC of the subset of CCs indicated in the control message. In some examples, the CC identifier 825 may identify a second subset of CCs of the set of CCs, where each CC of the second subset of CCs is associated with a same set of configured candidate TCI states. In some examples, the CC identifier 825 may identify a second subset of CCs of the set of CCs, where each CC of the second subset of CCs is associated with a same frequency band.

The TCI state manager 830 may apply the active TCI state to each CC of the subset of CCs associated with the control resource set identifier. In some examples, the TCI state manager 830 may apply the active TCI state to each CC of the second subset of CCs. In some cases, the TCI state manager 830 may apply the set of active TCI states for the shared channel across each of the first set of BWP CC pairs. In some aspects, the TCI state manager 830 may apply the set of active TCI states for the shared channel across each of the second set of BWP CC pairs. In some instances, the TCI state manager 830 may apply the active TCI state to each BWP CC pair of the second set of BWP CC pairs.

The BWP CC pair identifier 835 may identify a first set of BWP CC pairs based on the control message, where each of the first set of BWP CC pairs includes a CC of the set of CCs. In some examples, the BWP CC pair identifier 835 may identify a second set of BWP CC pairs, where each of the second set of BWP CC pairs is associated with a same set of configured candidate TCI states as each of the first set of BWP CC pairs indicated in the control message. In some cases, the BWP CC pair identifier 835 may identify a second set of BWP CC pairs, where each of the second set of BWP CC pairs is associated with a same set of configured candidate TCI states. In some aspects, the BWP CC pair identifier 835 may identify a second set of BWP CC pairs, where each BWP CC pair of the second set of BWP CC pairs is associated with a same frequency band. In some instances, the BWP CC pair identifier 835 may identify a second set of BWP CC pairs, where each of the second set of BWP CC pairs is associated with a same set of configured candidate TCI states as each of the first set of BWP CC pair indicated in the control message. In some cases, the shared channel includes a PDSCH.

The SRS component 840 may configure resources for the SRS for each of the first set of BWP CC pairs according to the spatial relation RS identifier. In some examples, the SRS component 840 may configure resources for the SRS for each of the second set of BWP CC pairs. In some cases, the SRS includes a periodic SRS, a semi-persistent SRS, or an aperiodic SRS.

The QCL manager 845 may report, to the base station, a group of CCs or a set of BWP CC pairs configured for the UE that are spatially quasi-located, where the group of CCs or the set of BWP CC pairs includes the set of CCs.

Figure 9:
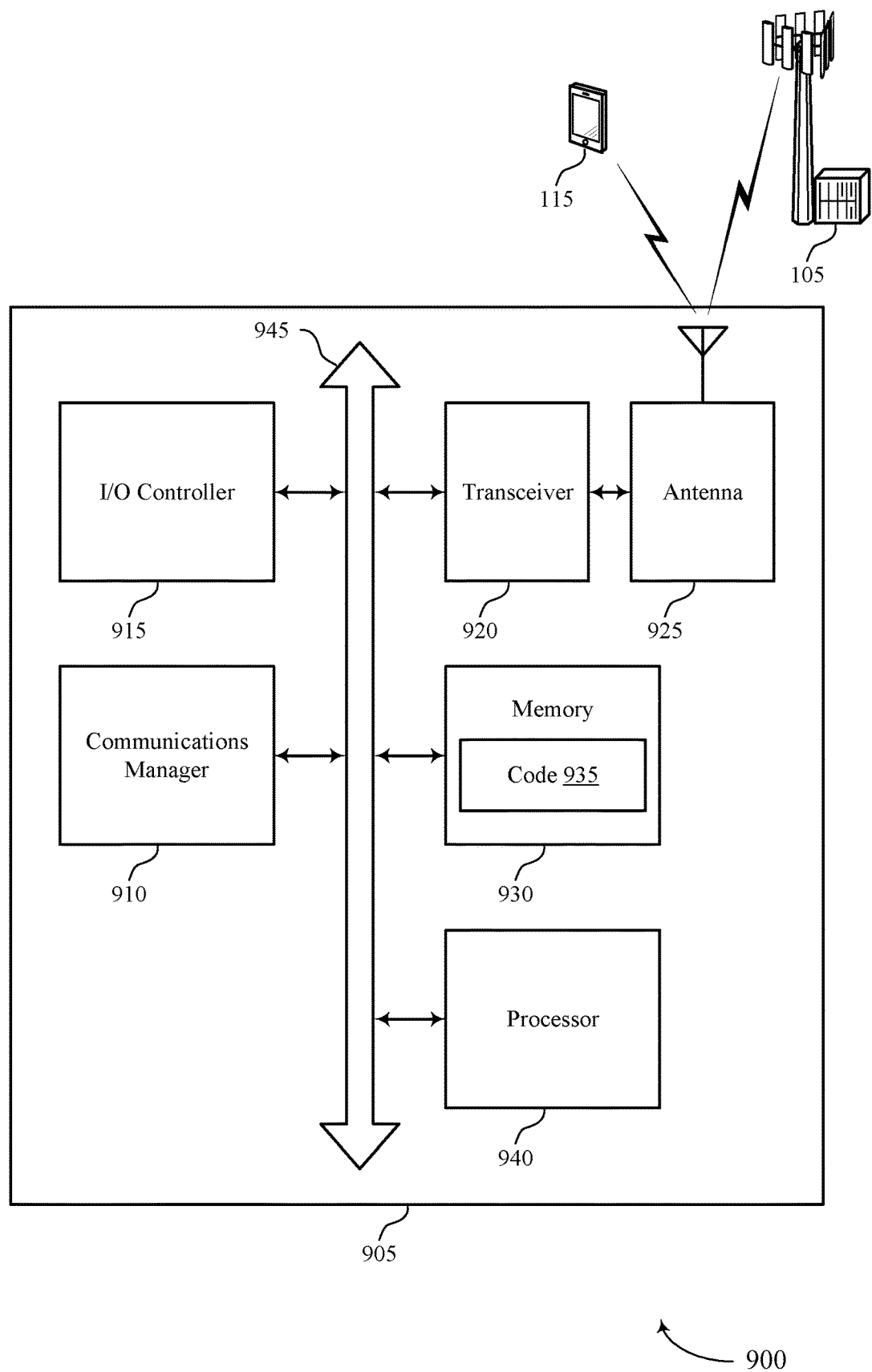
FIG. 9 shows a diagram of a system including a device that supports communication configuration for multiple CCs in accordance with aspects of the present disclosure.

FIG. 9 shows a diagram of a system 900 including a device 905 that supports communication configuration for multiple CCs in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive a control message from a base station that indicates, for a set of CCs configured for the UE, one or more of: an active TCI state, a set of active TCI states, or a spatial relation RS identifier, determine a communication configuration for at least one CC of the set of CCs based on the control message, and perform or receive a transmission using the at least one CC based on the communication configuration.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the device 905 may include a single antenna 925, or the device 905 may have more than one antenna 925, which may be capable of concurrently transmitting or receiving multiple wireless transmissions.

The memory 930 may include random access memory (RAM) and read only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting communication configuration for multiple CCs).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
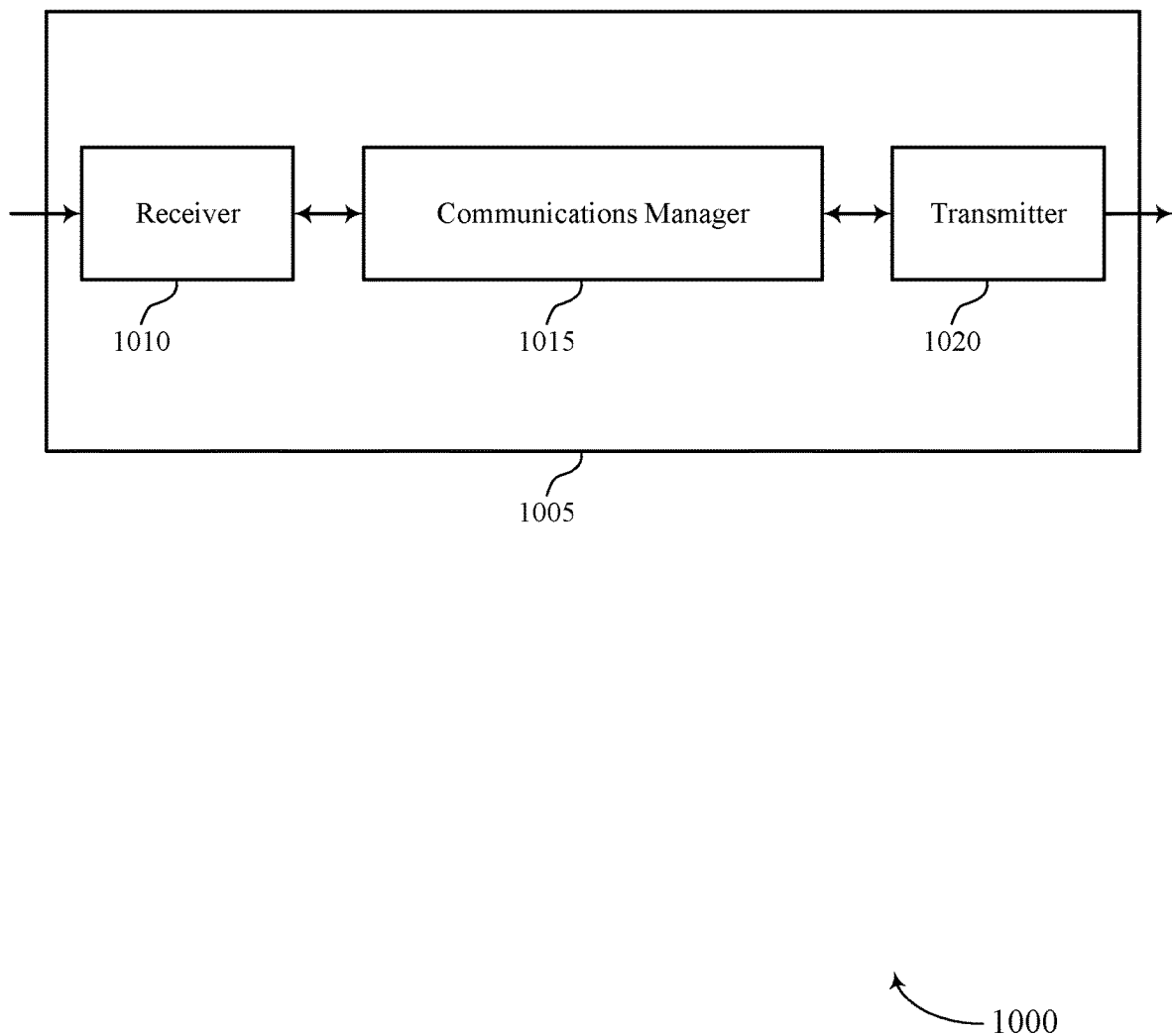
FIGS. 10 and 11 show block diagrams of devices that support communication configuration for multiple CCs in accordance with aspects of the present disclosure.

FIG. 10 shows a block diagram 1000 of a device 1005 that supports communication configuration for multiple CCs in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to communication configuration for multiple CCs, etc.). Information may be passed on to other components of the device 1005. The receiver 1010 may be an example of aspects of the transceiver 1320 described with reference to FIG. 13. The receiver 1010 may utilize a single antenna or multiple antennas.

The communications manager 1015 may identify, for a set of CCs configured for a UE, one or more of: an active TCI state, a set of active TCI states, or a spatial relation RS identifier, transmit a control message to the UE that indicates the active TCI state, the set of active TCI states, the spatial relation RS identifier, or any combination thereof for the set of CCs, and perform or receive a transmission using at least one CC of the set of CCs configured based on the control message. The actions performed by the communications manager 1015 as described herein may be implemented to realize one or more potential advantages. One implementation may allow a base station 105 to reduce processing complexity by reducing the transmission of excessive MAC-CE signaling to schedule the same resources or apply the same TCI state for multiple CCs (or BWP CC pairs). The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or multiple antennas.

Figure 11:
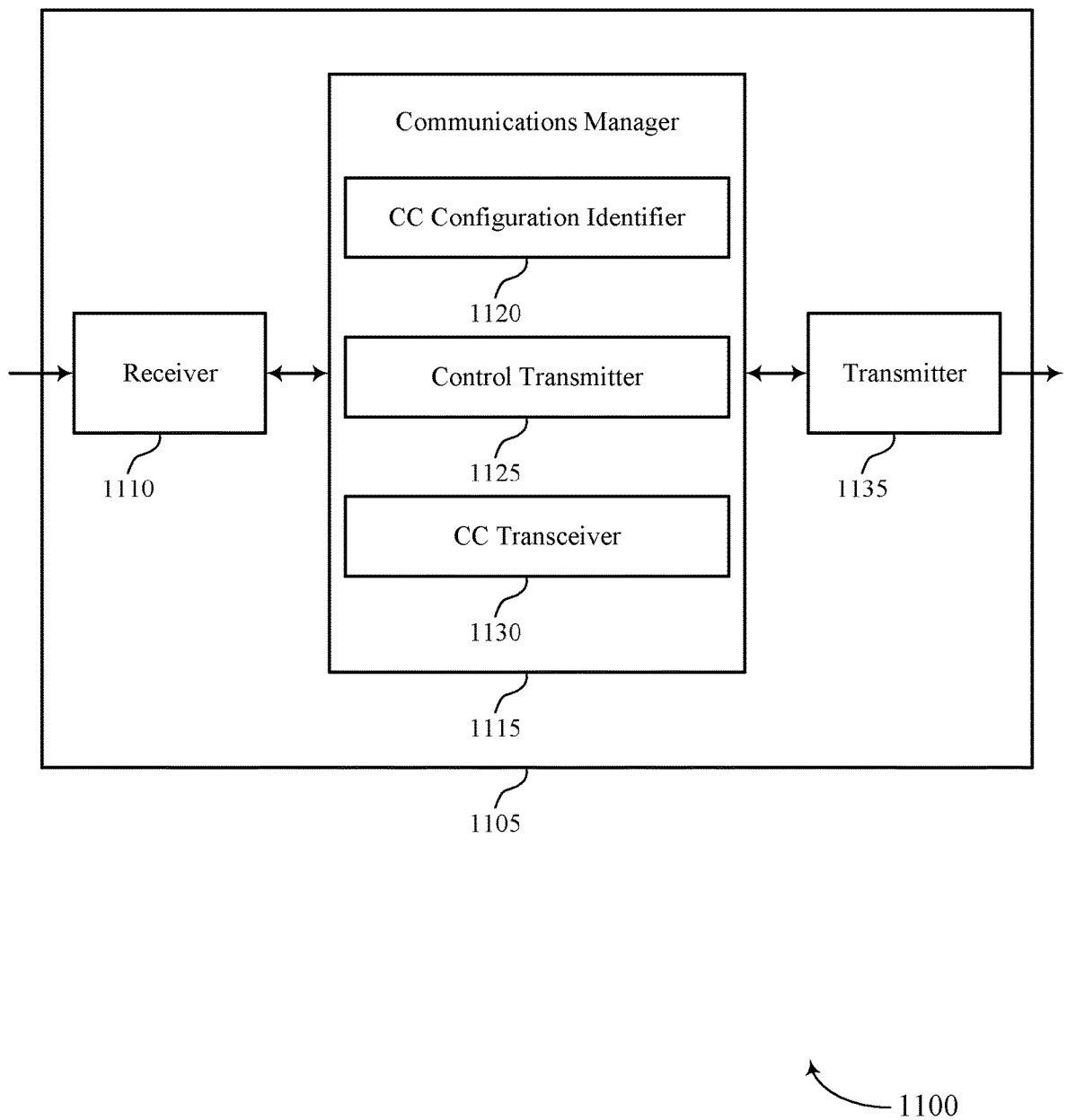

FIG. 11 shows a block diagram 1100 of a device 1105 that supports communication configuration for multiple CCs in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to communication configuration for multiple CCs, etc.). Information may be passed on to other components of the device 1105. The receiver 1110 may be an example of aspects of the transceiver 1320 described with reference to FIG. 13. The receiver 1110 may utilize a single antenna or multiple antennas.

The communications manager 1115 may be an example of aspects of the communications manager 1015 as described herein. The communications manager 1115 may include a CC configuration identifier 1120, a control transmitter 1125, and a CC transceiver 1130. The communications manager 1115 may be an example of aspects of the communications manager 1310 described herein.

The CC configuration identifier 1120 may identify, for a set of CCs configured for a UE, one or more of: an active TCI state, a set of active TCI states, or a spatial relation RS identifier.

The control transmitter 1125 may transmit a control message to the UE that indicates the active TCI state, the set of active TCI states, the spatial relation RS identifier, or any combination thereof for the set of CCs.

The CC transceiver 1130 may perform or receive a transmission using at least one CC of the set of CCs configured based on the control message.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or multiple antennas.

Figure 12:
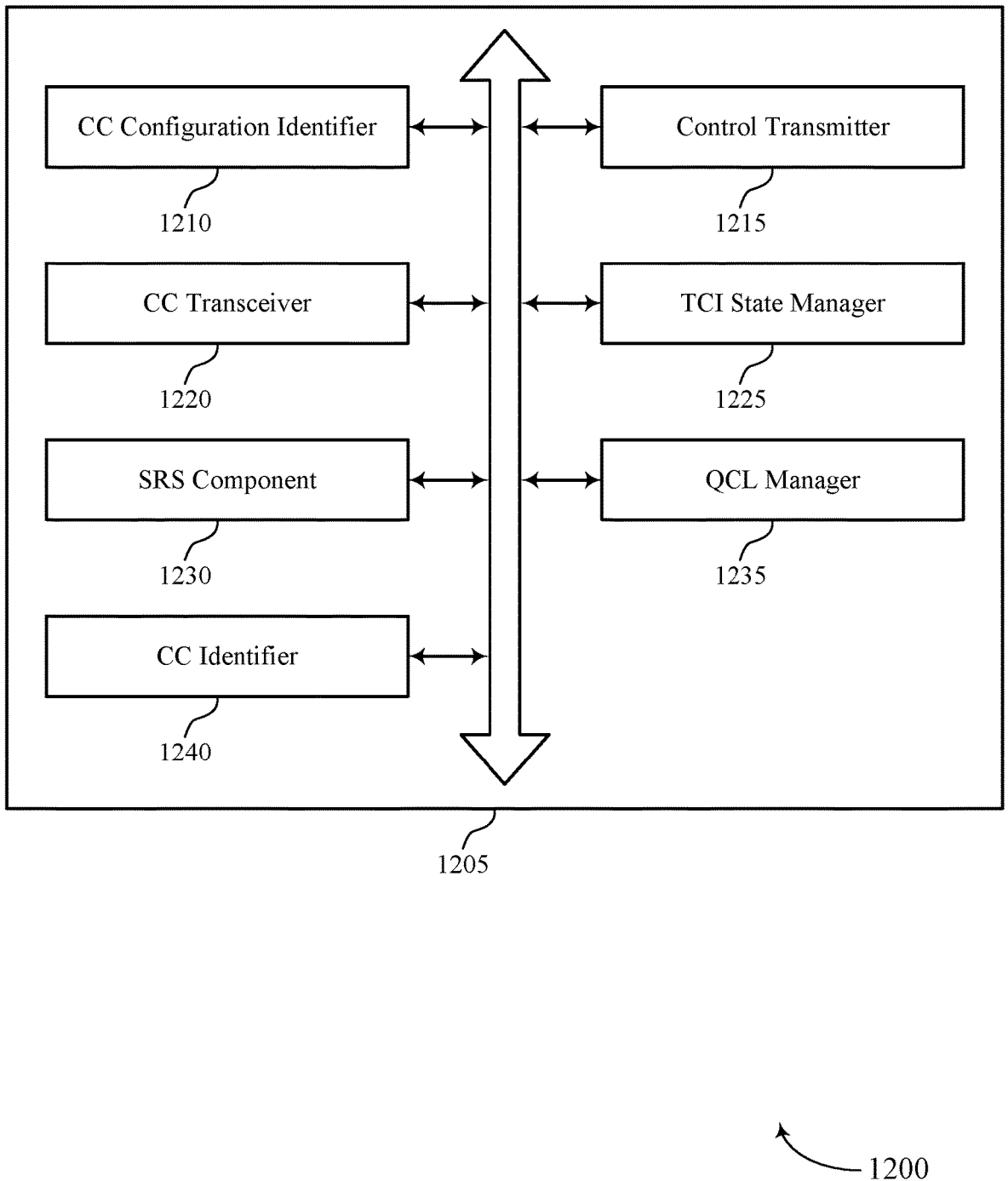
FIG. 12 shows a block diagram of a communications manager that supports communication configuration for multiple CCs in accordance with aspects of the present disclosure.

FIG. 12 shows a block diagram 1200 of a communications manager 1205 that supports communication configuration for multiple CCs in accordance with aspects of the present disclosure. The communications manager 1205 may be an example of aspects of a communications manager 1015, a communications manager 1115, or a communications manager 1310 described herein. The communications manager 1205 may include a CC configuration identifier 1210, a control transmitter 1215, a CC transceiver 1220, a TCI state manager 1225, an SRS component 1230, a QCL manager 1235, and a CC identifier 1240. Each of these modules may communicate, directly or indirectly, with one another (e.g., via one or more buses).

The CC configuration identifier 1210 may identify, for a set of CCs configured for a UE, one or more of: an active TCI state, a set of active TCI states, or a spatial relation RS identifier.

The control transmitter 1215 may transmit a control message to the UE that indicates the active TCI state, the set of active TCI states, the spatial relation RS identifier, or any combination thereof for the set of CCs. In some examples, the control transmitter 1215 may transmit an indication of the set of CCs or a set of BWP CC pairs for configuration according to the active TCI state, the set of active TCI states, or the spatial relation RS identifier, where the indication is separate from the control message. In some cases, a format of the control message corresponds to a TCI selection format for indicating the active TCI state, the set of active TCI states, the spatial relation RS identifier, or any combination thereof for the set of CCs. In some aspects, the control message includes a MAC-CE.

The CC transceiver 1220 may perform or receive a transmission using at least one CC of the set of CCs configured based on the control message.

The TCI state manager 1225 may select the active TCI state for the set of CCs based on a control resource set identifier that is common to the set of CCs, where the control message indicates the active TCI state for the set of CCs and a CC identifier of the set of CCs. In some examples, the TCI state manager 1225 may select the active TCI state for the set of CCs based on a common active TCI state for the set of CCs, where the control message indicates the active TCI state for the set of CCs and an unspecified CC identifier. In some cases, the TCI state manager 1225 may select the active TCI state for the set of CCs based on a frequency band common to the set of CCs, where the control message indicates the active TCI state for the set of CCs. In some aspects, the TCI state manager 1225 may select the set of active TCI states for a shared channel of a first set of BWP CC pairs, each of the first set of BWP CC pairs is associated with a same set of configured candidate TCI states, where the control message indicates the set of active TCI states and a CC identifier of the set of CCs. In some instances, the TCI state manager 1225 may select the set of active TCI states for a shared channel of a first set of BWP CC pairs, each of the first set of BWP CC pairs is associated with a same set of configured candidate TCI states, where the control message indicates the set of active TCI states and an unspecified CC identifier. In some examples, the TCI state manager 1225 may select the set of active TCI states for a shared channel of a first set of BWP CC pairs, each of the first set of BWP CC pairs is associated with a same frequency band, where the control message indicates the set of active TCI states.

The SRS component 1230 may select the spatial relation RS identifier for a sounding RS of a first set of BWP CC pairs, each of the first set of BWP CC pairs is associated with a same set of configured candidate TCI states, where the control message indicates the spatial relation RS identifier and a BWP CC pair. In some examples, the SRS component 1230 may select the spatial relation RS identifier for a sounding RS of a first set of BWP CC pairs, each of the first set of BWP CC pairs is associated with a same set of configured candidate TCI states, where the control message indicates the spatial relation RS identifier and an unspecified BWP CC pair. In some cases, the SRS component 1230 may select the spatial relation RS identifier for a sounding RS of a first set of BWP CC pairs, each of the first set of BWP CC pairs is associated with a same frequency band, where the control message indicates the spatial relation RS identifier and an unspecified BWP CC pair.

The QCL manager 1235 may receive, from the UE, an indication of a group of CCs or a set of BWP CC pairs configured for the UE that are spatially quasi-located.

The CC identifier 1240 may identify the set of CCs based on the indication of the group of CC or the set of BWP CC pairs.

Figure 13:
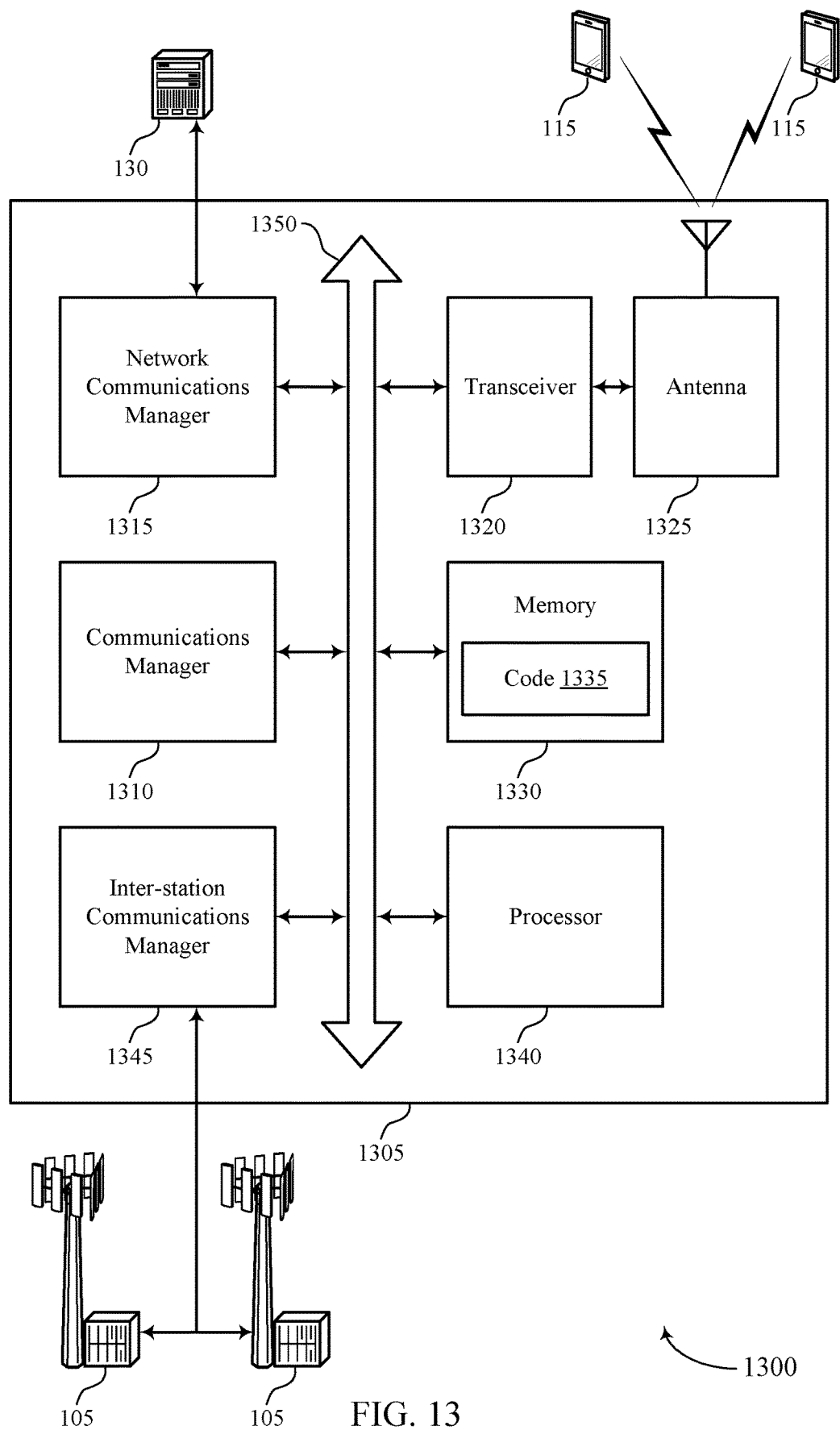
FIG. 13 shows a diagram of a system including a device that supports communication configuration for multiple CCs in accordance with aspects of the present disclosure.

FIG. 13 shows a diagram of a system 1300 including a device 1305 that supports communication configuration for multiple CCs in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may identify, for a set of CCs configured for a UE, one or more of: an active TCI state, a set of active TCI states, or a spatial relation RS identifier, transmit a control message to the UE that indicates the active TCI state, the set of active TCI states, the spatial relation RS identifier, or any combination thereof for the set of CCs, and perform or receive a transmission using at least one CC of the set of CCs configured based on the control message.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the device 1305 may include a single antenna 1325, or the device 1305 may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting communication configuration for multiple CCs).

The inter-station communications manager 1345 may manage communications with other base station 105 and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
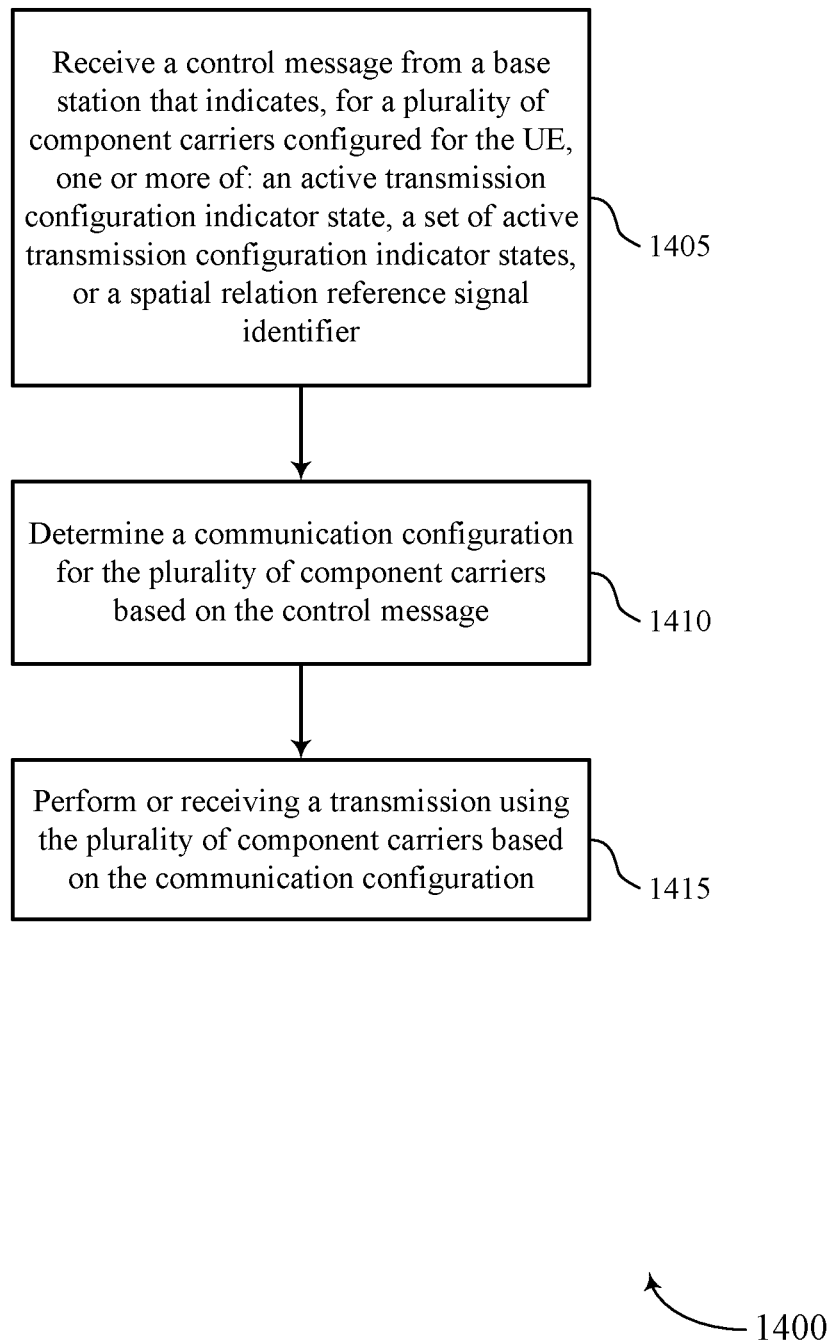
FIGS. 14 through 20 show flowcharts illustrating methods that support communication configuration for multiple CCs in accordance with aspects of the present disclosure.

FIG. 14 shows a flowchart illustrating a method 1400 that supports communication configuration for multiple CCs in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may receive a control message from a base station that indicates, for a plurality of CCs configured for the UE, one or more of: an active TCI state, a set of active TCI states, or a spatial relation RS identifier. The operations of 1405 may be performed according to the methods described herein. In some examples, aspects of the operations of 1405 may be performed by a control receiver as described with reference to FIGS. 6 through 9.

At 1410, the UE may determine a communication configuration for the plurality of CCs based on the control message. The operations of 1410 may be performed according to the methods described herein. In some examples, aspects of the operations of 1410 may be performed by a CC configuration manager as described with reference to FIGS. 6 through 9.

At 1415, the UE may perform or receive a transmission using the plurality of CCs based on the communication configuration. The operations of 1415 may be performed according to the methods described herein. In some examples, aspects of the operations of 1415 may be performed by a CC transceiver as described with reference to FIGS. 6 through 9.

Figure 15:
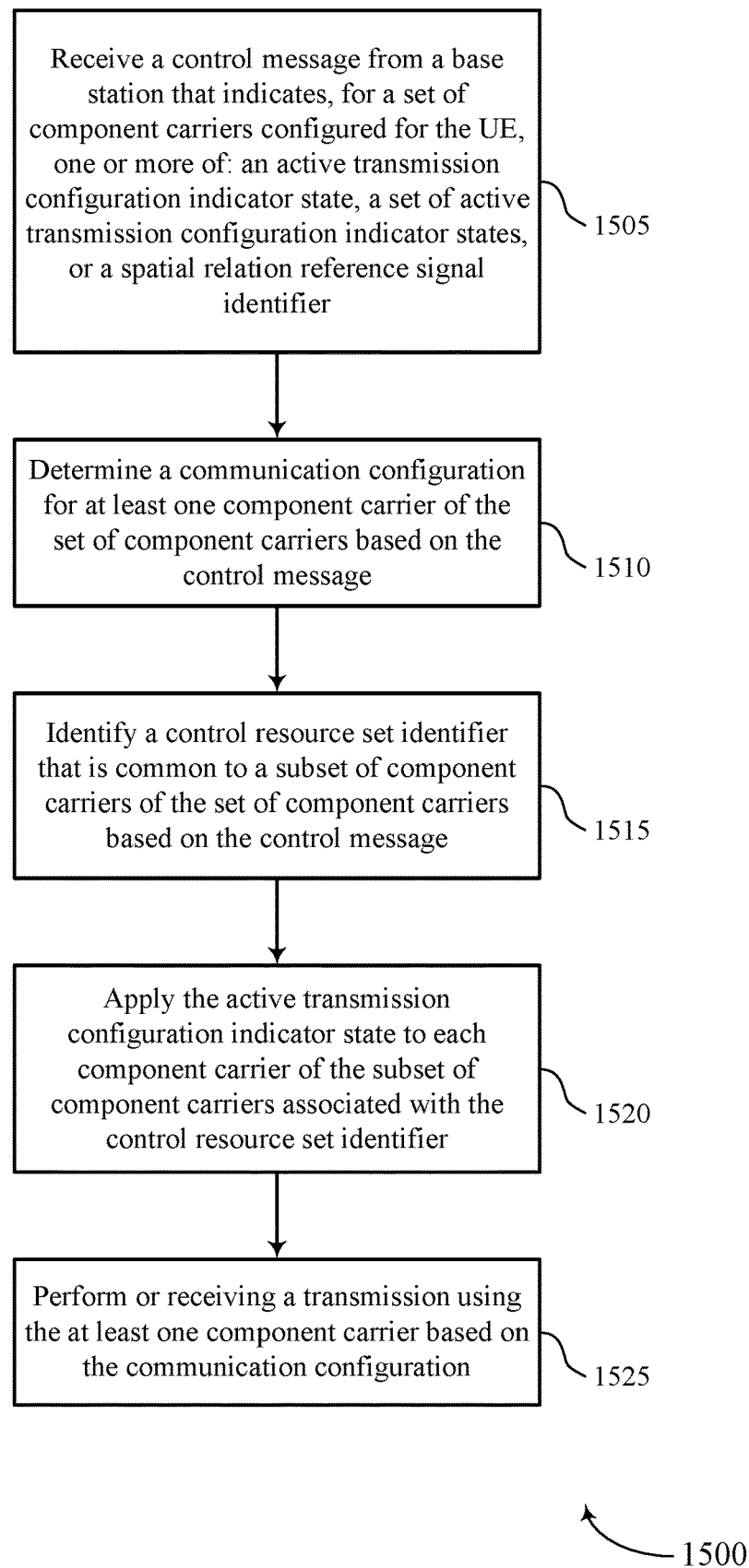

FIG. 15 shows a flowchart illustrating a method 1500 that supports communication configuration for multiple CCs in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1505, the UE may receive a control message from a base station that indicates, for a set of CCs configured for the UE, one or more of: an active TCI state, a set of active TCI states, or a spatial relation RS identifier. The operations of 1505 may be performed according to the methods described herein. In some examples, aspects of the operations of 1505 may be performed by a control receiver as described with reference to FIGS. 6 through 9.

At 1510, the UE may determine a communication configuration for at least one CC of the set of CCs based on the control message. The operations of 1510 may be performed according to the methods described herein. In some examples, aspects of the operations of 1510 may be performed by a CC configuration manager as described with reference to FIGS. 6 through 9.

At 1515, the UE may identify a control resource set identifier that is common to a subset of CCs of the set of CCs based on the control message. The operations of 1515 may be performed according to the methods described herein. In some examples, aspects of the operations of 1515 may be performed by a CC identifier as described with reference to FIGS. 6 through 9.

At 1520, the UE may apply the active TCI state to each CC of the subset of CCs associated with the control resource set identifier. The operations of 1520 may be performed according to the methods described herein. In some examples, aspects of the operations of 1520 may be performed by a TCI state manager as described with reference to FIGS. 6 through 9.

At 1525, the UE may perform or receive a transmission using the at least one CC based on the communication configuration. The operations of 1525 may be performed according to the methods described herein. In some examples, aspects of the operations of 1525 may be performed by a CC transceiver as described with reference to FIGS. 6 through 9.

Figure 16:
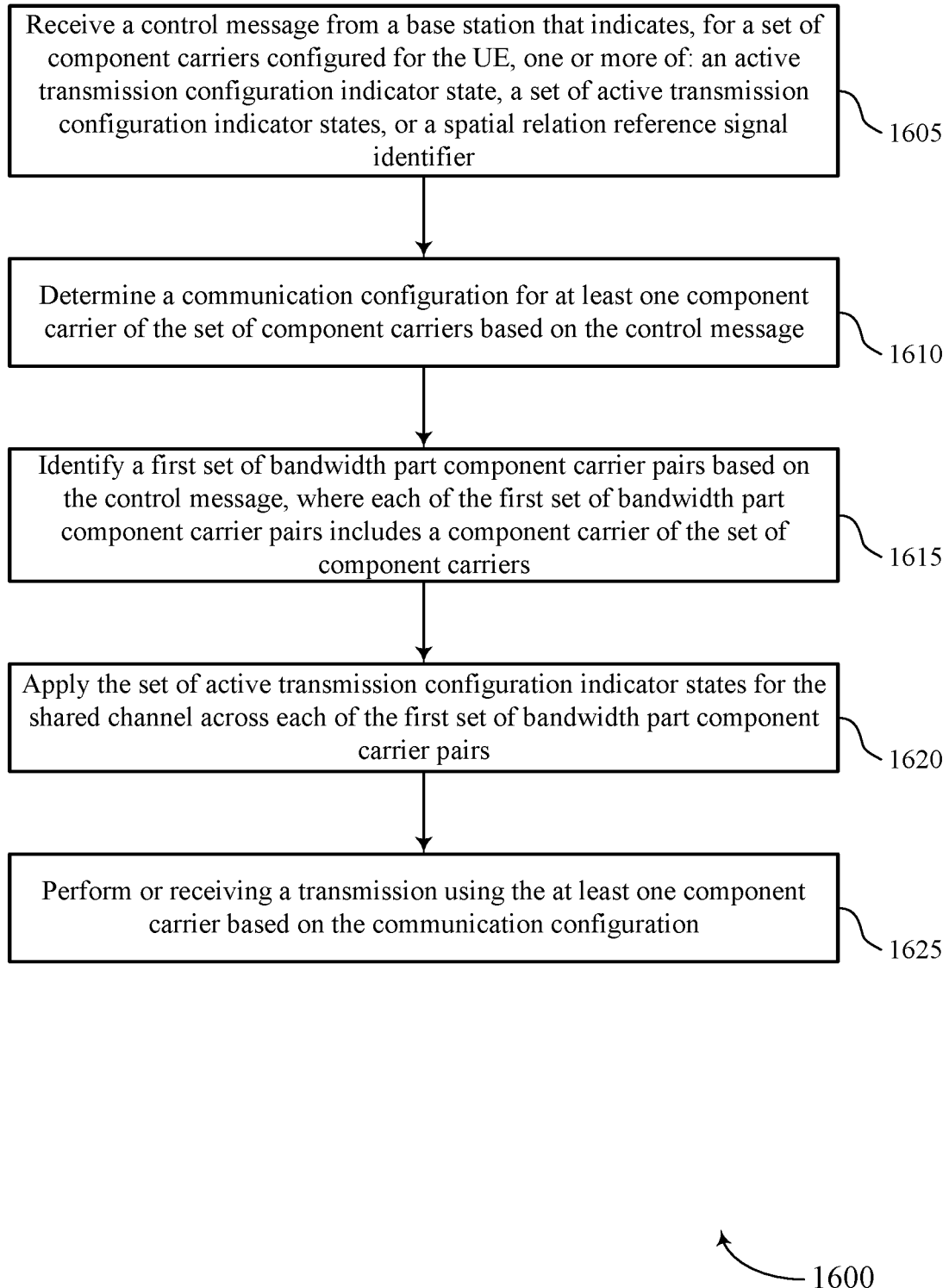

FIG. 16 shows a flowchart illustrating a method 1600 that supports communication configuration for multiple CCs in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1605, the UE may receive a control message from a base station that indicates, for a set of CCs configured for the UE, one or more of: an active TCI state, a set of active TCI states, or a spatial relation RS identifier. The operations of 1605 may be performed according to the methods described herein. In some examples, aspects of the operations of 1605 may be performed by a control receiver as described with reference to FIGS. 6 through 9.

At 1610, the UE may determine a communication configuration for at least one CC of the set of CCs based on the control message. The operations of 1610 may be performed according to the methods described herein. In some examples, aspects of the operations of 1610 may be performed by a CC configuration manager as described with reference to FIGS. 6 through 9.

At 1615, the UE may identify a first set of BWP CC pairs based on the control message, where each of the first set of BWP CC pairs includes a CC of the set of CCs. The operations of 1615 may be performed according to the methods described herein. In some examples, aspects of the operations of 1615 may be performed by a BWP CC pair identifier as described with reference to FIGS. 6 through 9.

At 1620, the UE may apply the set of active TCI states for the shared channel across each of the first set of BWP CC pairs. The operations of 1620 may be performed according to the methods described herein. In some examples, aspects of the operations of 1620 may be performed by a TCI state manager as described with reference to FIGS. 6 through 9.

At 1625, the UE may perform or receive a transmission using the at least one CC based on the communication configuration. The operations of 1625 may be performed according to the methods described herein. In some examples, aspects of the operations of 1625 may be performed by a CC transceiver as described with reference to FIGS. 6 through 9.

Figure 17:
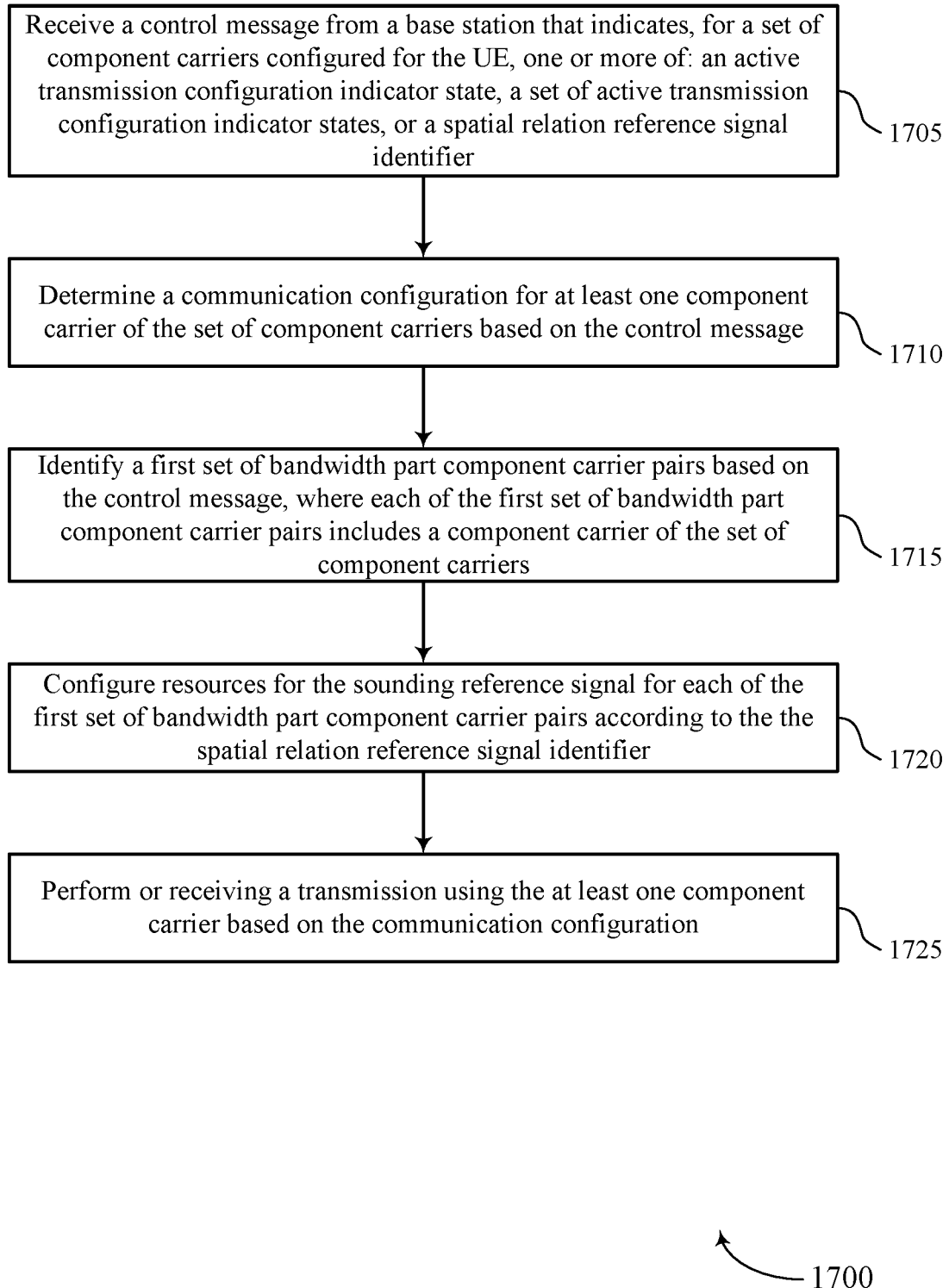

FIG. 17 shows a flowchart illustrating a method 1700 that supports communication configuration for multiple CCs in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1705, the UE may receive a control message from a base station that indicates, for a set of CCs configured for the UE, one or more of: an active TCI state, a set of active TCI states, or a spatial relation RS identifier. The operations of 1705 may be performed according to the methods described herein. In some examples, aspects of the operations of 1705 may be performed by a control receiver as described with reference to FIGS. 6 through 9.

At 1710, the UE may determine a communication configuration for at least one CC of the set of CCs based on the control message. The operations of 1710 may be performed according to the methods described herein. In some examples, aspects of the operations of 1710 may be performed by a CC configuration manager as described with reference to FIGS. 6 through 9.

At 1715, the UE may identify a first set of BWP CC pairs based on the control message, where each of the first set of BWP CC pairs includes a CC of the set of CCs. The operations of 1715 may be performed according to the methods described herein. In some examples, aspects of the operations of 1715 may be performed by a BWP CC pair identifier as described with reference to FIGS. 6 through 9.

At 1720, the UE may configure resources for the sounding RS for each of the first set of BWP CC pairs according to the spatial relation RS identifier. The operations of 1720 may be performed according to the methods described herein. In some examples, aspects of the operations of 1720 may be performed by an SRS component as described with reference to FIGS. 6 through 9.

At 1725, the UE may perform or receive a transmission using the at least one CC based on the communication configuration. The operations of 1725 may be performed according to the methods described herein. In some examples, aspects of the operations of 1725 may be performed by a CC transceiver as described with reference to FIGS. 6 through 9.

Figure 18:
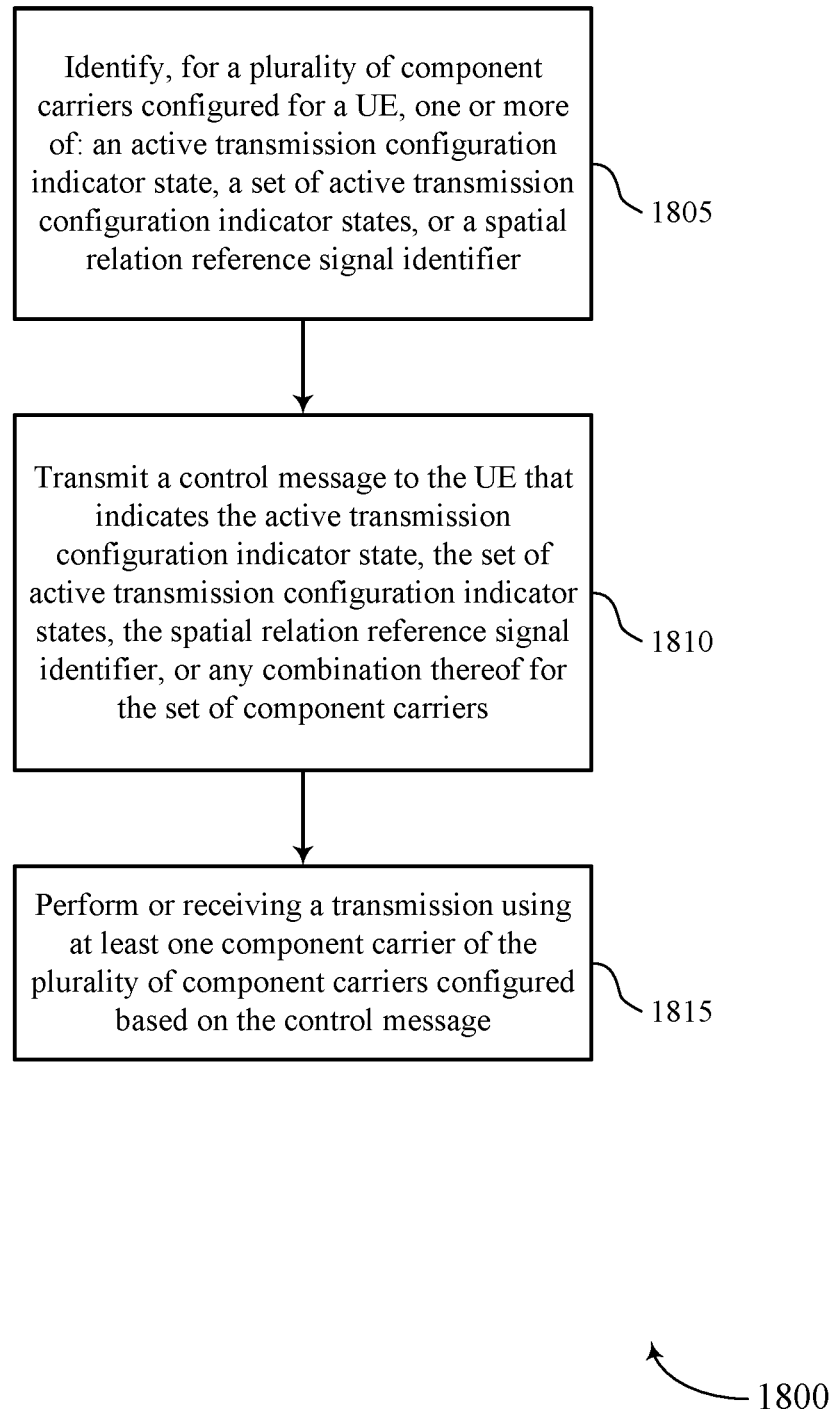

FIG. 18 shows a flowchart illustrating a method 1800 that supports communication configuration for multiple CCs in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1805, the base station may identify, for a plurality of CCs configured for a UE, one or more of: an active TCI state, a set of active TCI states, or a spatial relation RS identifier. The operations of 1805 may be performed according to the methods described herein. In some examples, aspects of the operations of 1805 may be performed by a CC configuration identifier as described with reference to FIGS. 10 through 13.

At 1810, the base station may transmit a control message to the UE that indicates the active TCI state, the set of active TCI states, the spatial relation RS identifier, or any combination thereof for the set of CCs. The operations of 1810 may be performed according to the methods described herein. In some examples, aspects of the operations of 1810 may be performed by a control transmitter as described with reference to FIGS. 10 through 13.

At 1815, the base station may perform or receive a transmission using the plurality of CCs configured based on the control message. The operations of 1815 may be performed according to the methods described herein. In some examples, aspects of the operations of 1815 may be performed by a CC transceiver as described with reference to FIGS. 10 through 13.

Figure 19:
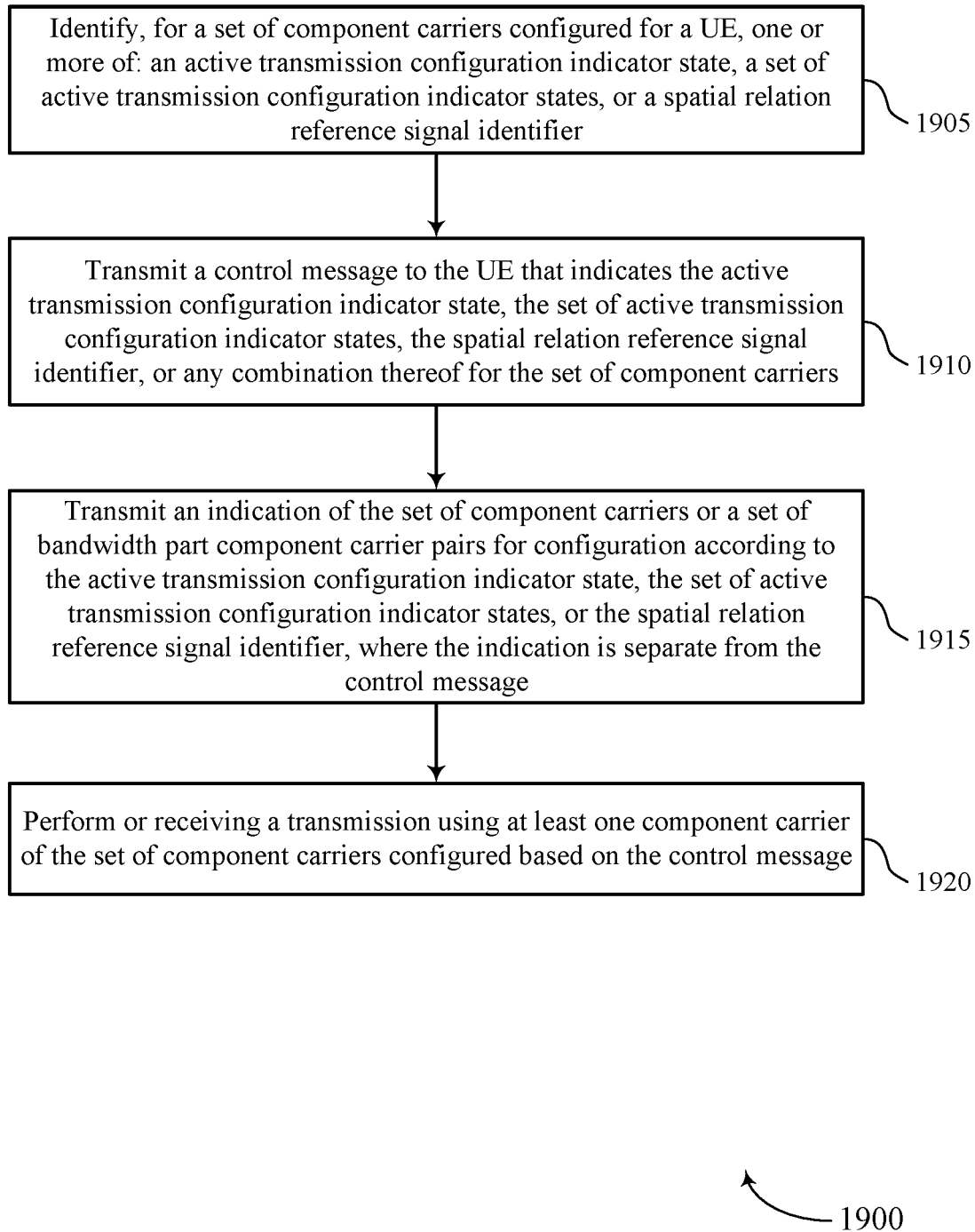

FIG. 19 shows a flowchart illustrating a method 1900 that supports communication configuration for multiple CCs in accordance with aspects of the present disclosure. The operations of method 1900 may be implemented by a base station 105 or its components as described herein. For example, the operations of method 1900 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1905, the base station may identify, for a set of CCs configured for a UE, one or more of: an active TCI state, a set of active TCI states, or a spatial relation RS identifier. The operations of 1905 may be performed according to the methods described herein. In some examples, aspects of the operations of 1905 may be performed by a CC configuration identifier as described with reference to FIGS. 10 through 13.

At 1910, the base station may transmit a control message to the UE that indicates the active TCI state, the set of active TCI states, the spatial relation RS identifier, or any combination thereof for the set of CCs. The operations of 1910 may be performed according to the methods described herein. In some examples, aspects of the operations of 1910 may be performed by a control transmitter as described with reference to FIGS. 10 through 13.

At 1915, the base station may transmit an indication of the set of CCs or a set of BWP CC pairs for configuration according to the active TCI state, the set of active TCI states, or the spatial relation RS identifier, where the indication is separate from the control message. The operations of 1915 may be performed according to the methods described herein. In some examples, aspects of the operations of 1915 may be performed by a control transmitter as described with reference to FIGS. 10 through 13.

At 1920, the base station may perform or receive a transmission using at least one CC of the set of CCs configured based on the control message. The operations of 1920 may be performed according to the methods described herein. In some examples, aspects of the operations of 1920 may be performed by a CC transceiver as described with reference to FIGS. 10 through 13.

Figure 20:
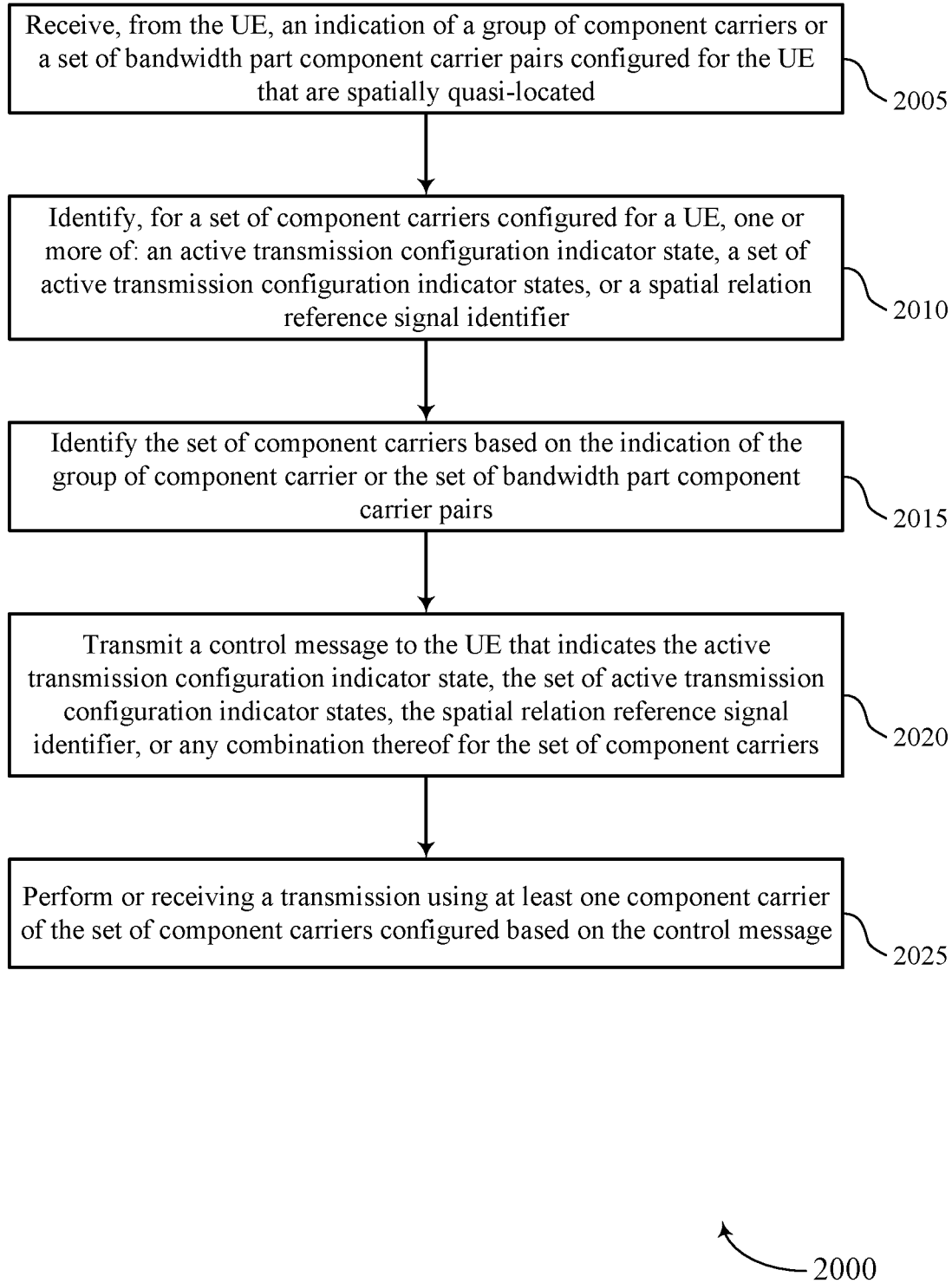

FIG. 20 shows a flowchart illustrating a method 2000 that supports communication configuration for multiple CCs in accordance with aspects of the present disclosure. The operations of method 2000 may be implemented by a base station 105 or its components as described herein. For example, the operations of method 2000 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 2005, the base station may receive, from the UE, an indication of a group of CCs or a set of BWP CC pairs configured for the UE that are spatially quasi-located. The operations of 2005 may be performed according to the methods described herein. In some examples, aspects of the operations of 2005 may be performed by a QCL manager as described with reference to FIGS. 10 through 13.

At 2010, the base station may identify, for a set of CCs configured for a UE, one or more of: an active TCI state, a set of active TCI states, or a spatial relation RS identifier. The operations of 2010 may be performed according to the methods described herein. In some examples, aspects of the operations of 2010 may be performed by a CC configuration identifier as described with reference to FIGS. 10 through 13.

At 2015, the base station may identify the set of CCs based on the indication of the group of CC or the set of BWP CC pairs. The operations of 2015 may be performed according to the methods described herein. In some examples, aspects of the operations of 2015 may be performed by a CC identifier as described with reference to FIGS. 10 through 13.

At 2020, the base station may transmit a control message to the UE that indicates the active TCI state, the set of active TCI states, the spatial relation RS identifier, or any combination thereof for the set of CCs. The operations of 2020 may be performed according to the methods described herein. In some examples, aspects of the operations of 2020 may be performed by a control transmitter as described with reference to FIGS. 10 through 13.

At 2025, the base station may perform or receive a transmission using at least one CC of the set of CCs configured based on the control message. The operations of 2025 may be performed according to the methods described herein. In some examples, aspects of the operations of 2025 may be performed by a CC transceiver as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA.

A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple CCs.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving a medium access control (MAC) layer control message from a network entity that indicates, for a plurality of component carriers configured for the UE, one or more of: an active transmission configuration indicator state, a set of active transmission configuration indicator states, or a spatial relation reference signal identifier;
   determining a communication configuration for the plurality of component carriers based at least in part on the MAC layer control message; and
   performing or receiving a transmission using the plurality of component carriers based at least in part on the communication configuration.

2. The method of claim 1, further comprising:
   identifying the plurality of component carriers or a set of bandwidth part component carrier pairs for configuration according to the active transmission configuration indicator state, the set of active transmission configuration indicator states, or the spatial relation reference signal identifier based at least in part on a format of the MAC layer control message, wherein the format corresponds to a transmission configuration indicator selection format.

3. The method of claim 1, further comprising:
   receiving an indication of the plurality of component carriers or a set of bandwidth part component carrier pairs for applying the active transmission configuration indicator state, the set of active transmission configuration indicator states, or the spatial relation reference signal identifier, wherein the indication is separate from the MAC layer control message.

4. The method of claim 1, further comprising:
   reporting, to the network entity, a group of component carriers or a set of bandwidth part component carrier pairs configured for the UE that are spatially quasi co-located, wherein the group of component carriers or the set of bandwidth part component carrier pairs comprises the plurality of component carriers.

5. The method of claim 1, wherein the MAC layer control message comprises a MAC-control element (MAC-CE).

6. The method of claim 1, wherein the MAC layer control message indicates the active transmission configuration indicator state for the plurality of component carriers, the method further comprising:
   identifying a control resource set identifier that is common to a subset of component carriers of the plurality of component carriers based at least in part on the MAC layer control message; and
   applying the active transmission configuration indicator state to each component carrier of the subset of component carriers associated with the control resource set identifier.

7. The method of claim 6, further comprising:
   identifying a second subset of component carriers of the plurality of component carriers, wherein each component carrier of the second subset of component carriers is associated with a same set of configured candidate transmission configuration indicator states as each component carrier of the subset of component carriers indicated in the MAC layer control message; and
   applying the active transmission configuration indicator state to each component carrier of the second subset of component carriers.

8. The method of claim 6, wherein the MAC layer control message indicates an unspecified component carrier identifier, the method further comprising:
   identifying a second subset of component carriers of the plurality of component carriers, wherein each component carrier of the second subset of component carriers is associated with a same set of configured candidate transmission configuration indicator states; and
   applying the active transmission configuration indicator state to each component carrier of the second subset of component carriers.

9. The method of claim 6, further comprising:
   identifying a second subset of component carriers of the plurality of component carriers, wherein each component carrier of the second subset of component carriers is associated with a same frequency band; and
   applying the active transmission configuration indicator state to each component carrier of the second subset of component carriers.

10. The method of claim 1, wherein the MAC layer control message indicates the set of active transmission configuration indicator states for a shared channel, the method further comprising:
    identifying a first set of bandwidth part component carrier pairs based at least in part on the MAC layer control message, wherein each of the first set of bandwidth part component carrier pairs includes a component carrier of the plurality of component carriers; and
    applying the set of active transmission configuration indicator states for the shared channel across each of the first set of bandwidth part component carrier pairs.

11. The method of claim 10, further comprising:
    identifying a second set of bandwidth part component carrier pairs, wherein each of the second set of bandwidth part component carrier pairs is associated with a same set of configured candidate transmission configuration indicator states as each of the first set of bandwidth part component carrier pairs indicated in the MAC layer control message; and applying the set of active transmission configuration indicator states for the shared channel across each of the second set of bandwidth part component carrier pairs.

12. The method of claim 10, wherein the MAC layer control message indicates an unspecified bandwidth part component carrier pair, the method further comprising:
identifying a second set of bandwidth part component carrier pairs, wherein each of the second set of bandwidth part component carrier pairs is associated with a same set of configured candidate transmission configuration indicator states; and
applying the set of active transmission configuration indicator states for the shared channel across each of the second set of bandwidth part component carrier pairs.

13. The method of claim 10, further comprising:
identifying a second set of bandwidth part component carrier pairs, wherein each bandwidth part component carrier pair of the second set of bandwidth part component carrier pairs is associated with a same frequency band; and
applying the active transmission configuration indicator state to the each bandwidth part component carrier pair of the second set of bandwidth part component carrier pairs.

14. The method of claim 10, wherein the shared channel comprises a physical downlink shared channel (PDSCH).

15. The method of claim 1, wherein the MAC layer control message indicates the spatial relation reference signal identifier for a sounding reference signal, the method further comprising:
identifying a first set of bandwidth part component carrier pairs based at least in part on the MAC layer control message, wherein each of the first set of bandwidth part component carrier pairs includes a component carrier of the plurality of component carriers; and
configuring resources for the sounding reference signal for each of the first set of bandwidth part component carrier pairs according to the spatial relation reference signal identifier.

16. The method of claim 15, further comprising:
identifying a second set of bandwidth part component carrier pairs, wherein each of the second set of bandwidth part component carrier pairs is associated with a same set of configured candidate transmission configuration indicator states as each of the first set of bandwidth part component carrier pairs indicated in the MAC layer control message; and
configuring resources for the sounding reference signal for each of the second set of bandwidth part component carrier pairs.

17. The method of claim 15, wherein the MAC layer control message indicates an unspecified bandwidth part component carrier pair, the method further comprising:
identifying a second set of bandwidth part component carrier pairs, wherein each of the second set of bandwidth part component carrier pairs is associated with a same set of configured candidate transmission configuration indicator states; and
configuring resources for the sounding reference signal for each of the second set of bandwidth part component carrier pairs.

18. The method of claim 15, further comprising:
identifying a second set of bandwidth part component carrier pairs, wherein each bandwidth part component carrier pair of the second set of bandwidth part component carrier pairs is associated with a same frequency band; and
configuring resources for the sounding reference signal for each of the second set of bandwidth part component carrier pairs.

19. The method of claim 15, wherein the sounding reference signal comprises a periodic sounding reference signal, a semi-persistent sounding reference signal, or an aperiodic sounding reference signal.

20. A method for wireless communications at a network entity, comprising:
identifying, for a plurality of component carriers configured for a user equipment (UE), one or more of: an active transmission configuration indicator state, a set of active transmission configuration indicator states, or a spatial relation reference signal identifier;
transmitting a medium access control (MAC) layer control message to the UE that indicates the active transmission configuration indicator state, the set of active transmission configuration indicator states, the spatial relation reference signal identifier, or any combination thereof for the plurality of component carriers; and
performing or receiving a transmission using the plurality of component carriers configured based at least in part on the MAC layer control message.

21. The method of claim 20, wherein a format of the MAC layer control message corresponds to a transmission configuration indicator selection format for indicating the active transmission configuration indicator state, the set of active transmission configuration indicator states, the spatial relation reference signal identifier, or any combination thereof for the plurality of component carriers.

22. The method of claim 20, further comprising:
transmitting an indication of the plurality of component carriers or a set of bandwidth part component carrier pairs for applying the active transmission configuration indicator state, the set of active transmission configuration indicator states, or the spatial relation reference signal identifier, wherein the indication is separate from the MAC layer control message.

23. The method of claim 20, further comprising:
receiving, from the UE, an indication of a group of component carriers or a set of bandwidth part component carrier pairs configured for the UE that are spatially quasi co-located; and
identifying the plurality of component carriers based at least in part on the indication of the group of component carriers or the set of bandwidth part component carrier pairs.

24. The method of claim 20, wherein the MAC layer control message comprises a MAC-control element (MAC-CE).

25. The method of claim 20, further comprising:
selecting the active transmission configuration indicator state for the plurality of component carriers based at least in part on a control resource set identifier that is common to the plurality of component carriers, wherein the MAC layer control message indicates the active transmission configuration indicator state for the plurality of component carriers and a component carrier identifier of the plurality of component carriers.

26. The method of claim 20, further comprising:
selecting the active transmission configuration indicator state for the plurality of component carriers based at least in part on a common active transmission configuration indicator state for the plurality of component carriers, wherein the MAC layer control message indicates the active transmission configuration indicator state for the plurality of component carriers and an unspecified component carrier identifier.

27. The method of claim 20, further comprising:
selecting the active transmission configuration indicator state for the plurality of component carriers based at least in part on a frequency band common to the plurality of component carriers, wherein the MAC layer control message indicates the active transmission configuration indicator state for the plurality of component carriers.

28. The method of claim 20, further comprising:
selecting the set of active transmission configuration indicator states for a shared channel of a first set of bandwidth part component carrier pairs, each of the first set of bandwidth part component carrier pairs is associated with a same set of configured candidate transmission configuration indicator states, wherein the MAC layer control message indicates the set of active transmission configuration indicator states and a component carrier identifier of the plurality of component carriers.

29. The method of claim 20, further comprising:
selecting the set of active transmission configuration indicator states for a shared channel of a first set of bandwidth part component carrier pairs, each of the first set of bandwidth part component carrier pairs is associated with a same set of configured candidate transmission configuration indicator states, wherein the MAC layer control message indicates the set of active transmission configuration indicator states and an unspecified component carrier identifier.

30. The method of claim 20, further comprising:
selecting the set of active transmission configuration indicator states for a shared channel of a first set of bandwidth part component carrier pairs, each of the first set of bandwidth part component carrier pairs is associated with a same frequency band, wherein the MAC layer control message indicates the set of active transmission configuration indicator states.

31. The method of claim 20, further comprising:
selecting the spatial relation reference signal identifier for a sounding reference signal of a first set of bandwidth part component carrier pairs, each of the first set of bandwidth part component carrier pairs is associated with a same set of configured candidate transmission configuration indicator states, wherein the MAC layer control message indicates the spatial relation reference signal identifier and a bandwidth part component carrier pair.

32. The method of claim 20, further comprising:
selecting the spatial relation reference signal identifier for a sounding reference signal of a first set of bandwidth part component carrier pairs, each of the first set of bandwidth part component carrier pairs is associated with a same set of configured candidate transmission configuration indicator states, wherein the MAC layer control message indicates the spatial relation reference signal identifier and an unspecified bandwidth part component carrier pair.

33. The method of claim 20, further comprising:
selecting the spatial relation reference signal identifier for a sounding reference signal of a first set of bandwidth part component carrier pairs, each of the first set of bandwidth part component carrier pairs is associated with a same frequency band, wherein the MAC layer control message indicates the spatial relation reference signal identifier and an unspecified bandwidth part component carrier pair.

34. An apparatus for wireless communications at a user equipment (UE), comprising:
a processor,
memory in electronic communication with the processor; and
instructions stored in the memory and executable by the processor to cause the apparatus to:
receive a medium access control (MAC) layer control message from a network entity that indicates, for a plurality of component carriers configured for the UE, one or more of: an active transmission configuration indicator state, a set of active transmission configuration indicator states, or a spatial relation reference signal identifier;
determine a communication configuration for the plurality of component carriers based at least in part on the MAC layer control message; and
perform or receive a transmission using the plurality of component carriers based at least in part on the communication configuration.

35. The apparatus of claim 34, wherein the instructions are further executable by the processor to cause the apparatus to:
identify the plurality of component carriers or a set of bandwidth part component carrier pairs for configuration according to the active transmission configuration indicator state, the set of active transmission configuration indicator states, or the spatial relation reference signal identifier based at least in part on a format of the MAC layer control message, wherein the format corresponds to a transmission configuration indicator selection format.

36. The apparatus of claim 34, wherein the instructions are further executable by the processor to cause the apparatus to:
receive an indication of the plurality of component carriers or a set of bandwidth part component carrier pairs for applying the active transmission configuration indicator state, the set of active transmission configuration indicator states, or the spatial relation reference signal identifier, wherein the indication is separate from the MAC layer control message.

37. The apparatus of claim 34, wherein the instructions are further executable by the processor to cause the apparatus to:
report, to the network entity, a group of component carriers or a set of bandwidth part component carrier pairs configured for the UE that are spatially quasi co-located, wherein the group of component carriers or the set of bandwidth part component carrier pairs comprises the plurality of component carriers.

38. The apparatus of claim 34, wherein the MAC layer control message comprises a MAC-control element (MAC-CE).

39. An apparatus for wireless communications at a network entity, comprising:
a processor,
memory in electronic communication with the processor; and
instructions stored in the memory and executable by the processor to cause the apparatus to:
identify, for a plurality of component carriers configured for a user equipment (UE), one or more of: an active transmission configuration indicator state, a set of active transmission configuration indicator states, or a spatial relation reference signal identifier;

transmit a medium access control (MAC) layer control message to the UE that indicates the active transmission configuration indicator state, the set of active transmission configuration indicator states, the spatial relation reference signal identifier, or any combination thereof for the plurality of component carriers; and perform or receive a transmission using the plurality of component carriers configured based at least in part on the MAC layer control message.

40. The apparatus of claim 39, wherein a format of the MAC layer control message corresponds to a transmission configuration indicator selection format for indicating the active transmission configuration indicator state, the set of active transmission configuration indicator states, the spatial relation reference signal identifier, or any combination thereof for the plurality of component carriers.

41. The apparatus of claim 39, wherein the instructions are further executable by the processor to cause the apparatus to:

transmit an indication of the plurality of component carriers or a set of bandwidth part component carrier pairs for applying the active transmission configuration indicator state, the set of active transmission configuration indicator states, or the spatial relation reference signal identifier, wherein the indication is separate from the MAC layer control message.

42. The apparatus of claim 39, wherein the instructions are further executable by the processor to cause the apparatus to:

receive, from the UE, an indication of a group of component carriers or a set of bandwidth part component carrier pairs configured for the UE that are spatially quasi co-located; and identify the plurality of component carriers based at least in part on the indication of the group of component carriers or the set of bandwidth part component carrier pairs.

43. The apparatus of claim 39, wherein the MAC layer control message comprises a MAC-control element (MAC-CE).

* * * * *